US012627404B2

(12) United States Patent
Yapici et al.

(10) Patent No.: US 12,627,404 B2
(45) Date of Patent: May 12, 2026

(54) INFORMATION TRANSFER VIA CHANNEL-ADAPTIVE SPACE TIME BLOCK CODES OVER RECONFIGURABLE INTELLIGENT SURFACES

(71) Applicant: QUALCOMM Incorporated, San Diego, CA (US)

(72) Inventors: Yavuz Yapici, Florham Park, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 436 days.

(21) Appl. No.: 18/319,403

(22) Filed: May 17, 2023

(65) Prior Publication Data

US 2024/0388381 A1 Nov. 21, 2024

(51) Int. Cl.
*H04L 1/06* (2006.01)

(52) U.S. Cl.
CPC .................................. *H04L 1/0643* (2013.01)

(58) Field of Classification Search
CPC ..................................................... H04L 1/0643
USPC ......................................................... 370/329
See application file for complete search history.

(56) References Cited

U.S. PATENT DOCUMENTS

| | | | |
|---|---|---|---|
| 2012/0069830 A1* | 3/2012 | Shi ........................ | H04L 1/0067 |
| | | | 370/474 |
| 2022/0052764 A1* | 2/2022 | Medra .................. | H04B 10/614 |
| 2023/0327714 A1* | 10/2023 | Baligh .................. | H04B 7/088 |
| | | | 375/262 |
| 2025/0274166 A1* | 8/2025 | Duarte ............... | H04B 7/04013 |

* cited by examiner

*Primary Examiner* — Faisal Choudhury
(74) *Attorney, Agent, or Firm* — Holland & Hart LLP

(57) ABSTRACT

Methods, systems, and devices for wireless communications are described. Generally, the techniques described herein may enable information transfer via channel-adaptive space time block codes (STBCs) over reconfigurable intelligent surfaces (RISs). For example, a network entity may transmit a control message indicating a set of parameters associated with an STBC of multiple STBCs associated with a RIS, where the set of parameters includes a size of the STBC. The network entity may transmit, to the RIS, a downlink message and the RIS may encode one or more information bits on the downlink message according to the parameters associated with the STBC. Additionally, the RIS may reflect the downlink message to a UE based on the set of parameters, where the reflected message includes the one or more information bits, and the UE may identify the one or more information bits based on a detection procedure associated with the set of parameters.

28 Claims, 14 Drawing Sheets

130    105                    115

Network
Entity

Transceiver                    Antenna 710                            715

Communications
Manager

Memory

Code

730

720              740          725

Processor

735

705

700

Configuration Component

1025

Channel Estimation Component

1035

Decoding Component

1030

1020

1000

Figure 12:
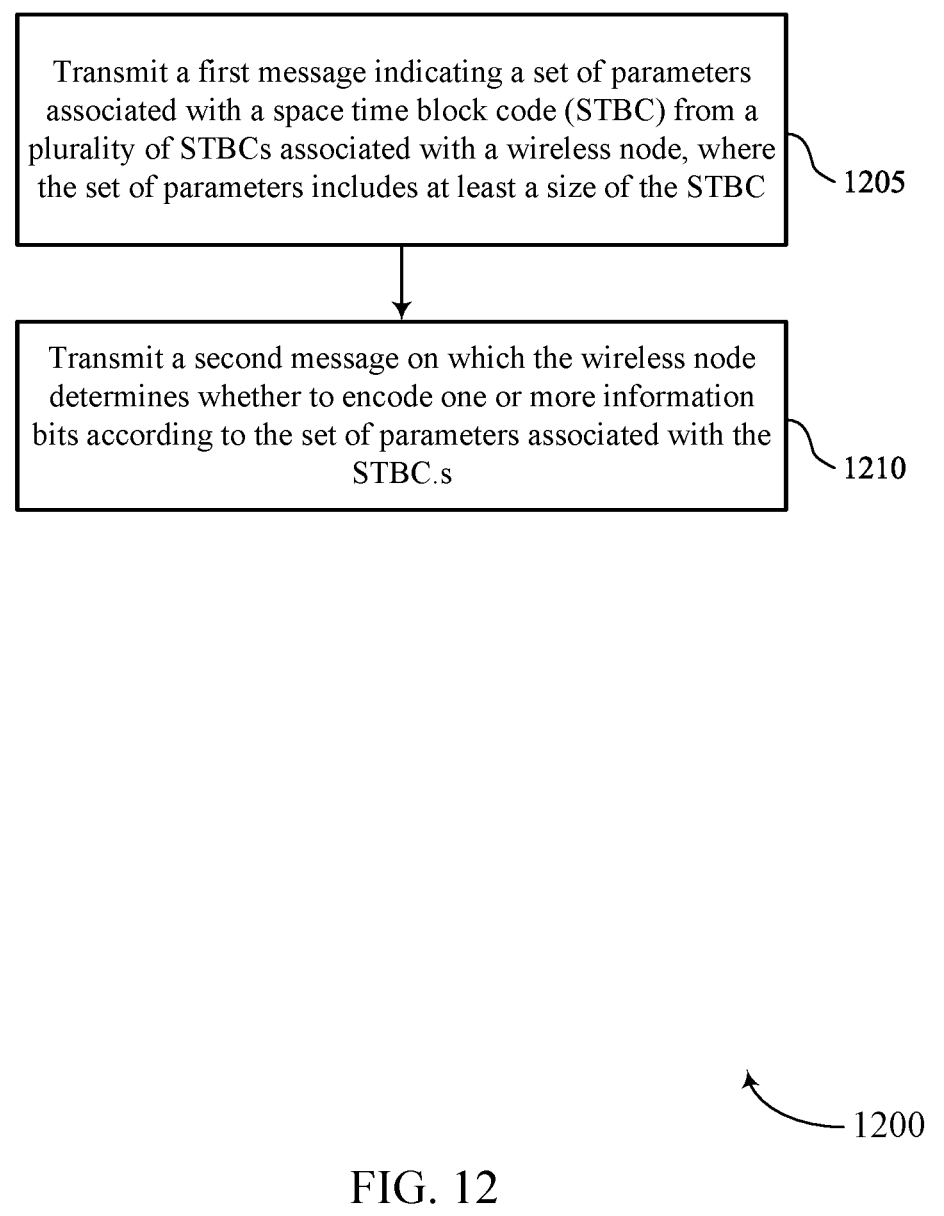

Transmit a first message indicating a set of parameters associated with a space time block code (STBC) from a plurality of STBCs associated with a wireless node, where the set of parameters includes at least a size of the STBC    1205

Transmit a second message on which the wireless node determines whether to encode one or more information bits according to the set of parameters associated with the STBC.s    1210

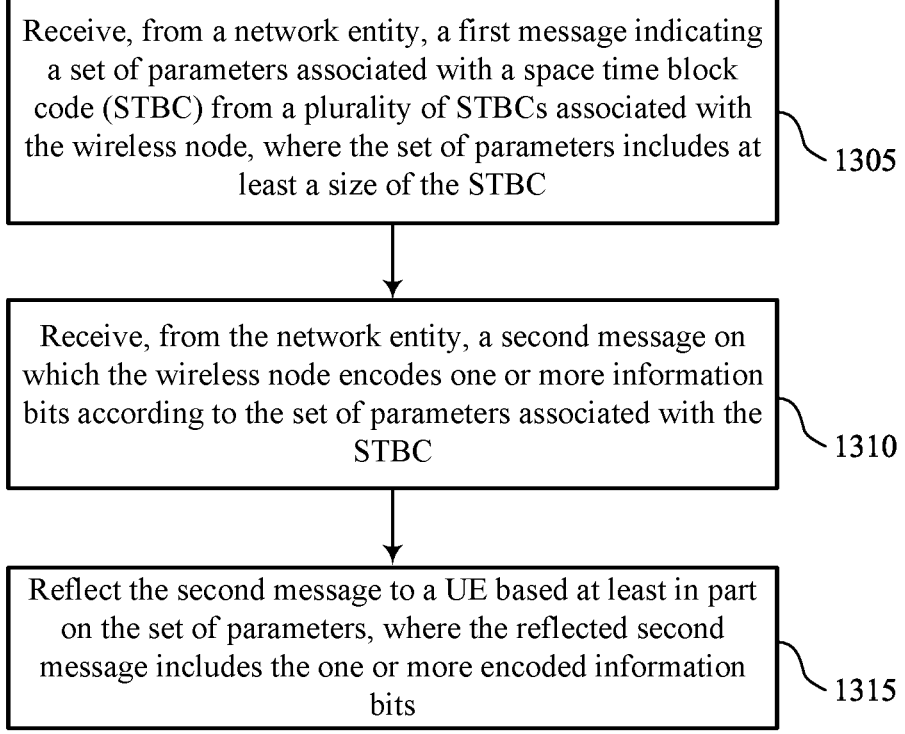

Receive, from a network entity, a first message indicating a set of parameters associated with a space time block code (STBC) from a plurality of STBCs associated with the wireless node, where the set of parameters includes at least a size of the STBC

1305

Receive, from the network entity, a second message on which the wireless node encodes one or more information bits according to the set of parameters associated with the STBC

1310

Reflect the second message to a UE based at least in part on the set of parameters, where the reflected second message includes the one or more encoded information bits

Figure 14:
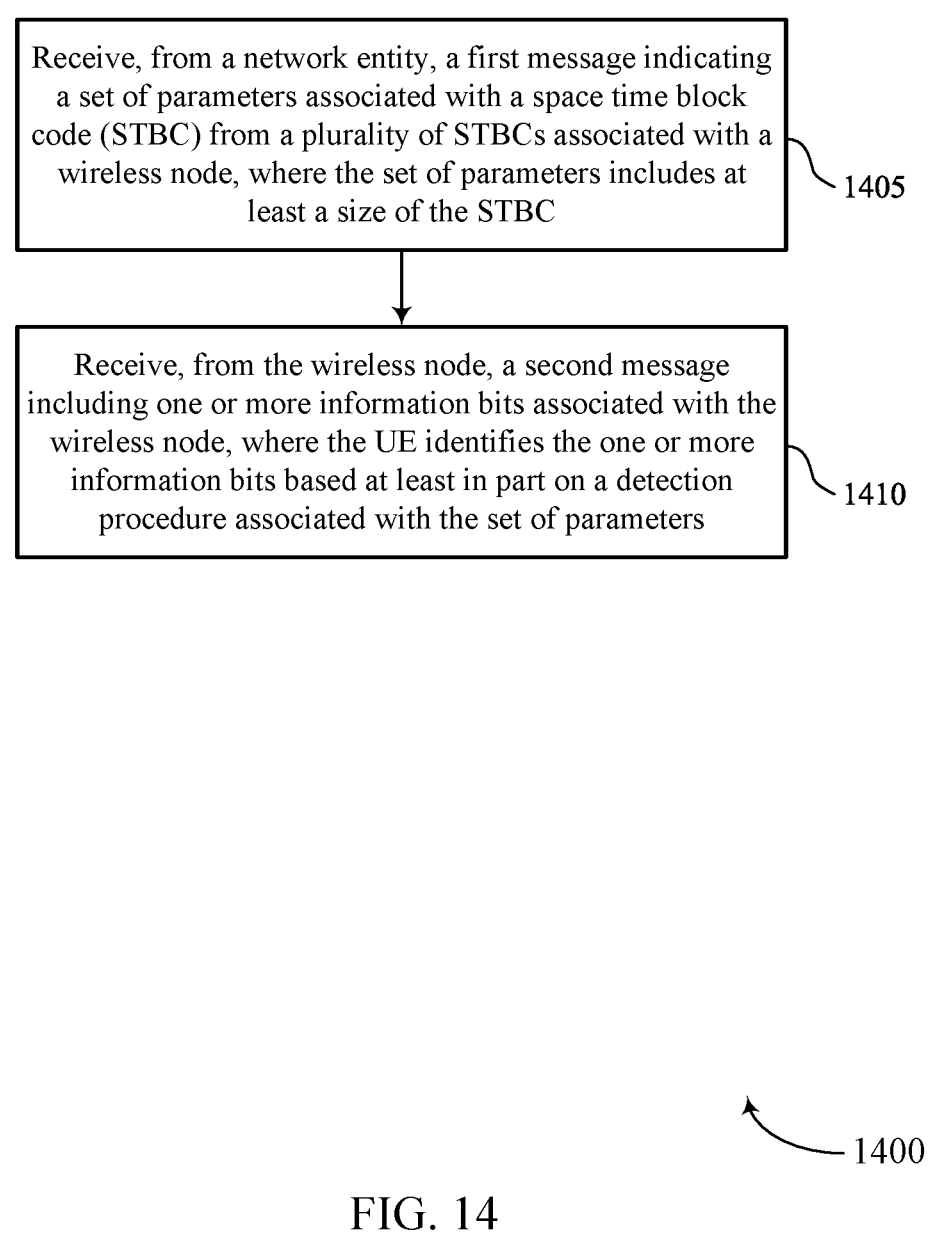

Receive, from a network entity, a first message indicating a set of parameters associated with a space time block code (STBC) from a plurality of STBCs associated with a wireless node, where the set of parameters includes at least a size of the STBC ⎸ 1405

Receive, from the wireless node, a second message including one or more information bits associated with the wireless node, where the UE identifies the one or more information bits based at least in part on a detection procedure associated with the set of parameters ⎸ 1410

INFORMATION TRANSFER VIA CHANNEL-ADAPTIVE SPACE TIME BLOCK CODES OVER RECONFIGURABLE INTELLIGENT SURFACES

FIELD OF TECHNOLOGY

The following relates to wireless communications, including information transfer via channel-adaptive space time block codes (STBCs) over reconfigurable intelligent surfaces (RISs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support information transfer via channel-adaptive space time block codes (STBCs) over reconfigurable intelligent surfaces (RISs). Generally, the techniques described herein may enable a network entity to transit an indication of an STBC from multiple STBCs associated with a RIS, such that the RIS may encode data associated with the RIS, such as identifier data, maintenance results, or sensor information, onto a reflected signal using the indicated STBC. For example, a network entity may transmit, to an RIS and a user equipment (UE), a control message indicating a set of parameters associated with an STBC from multiple STBCs associated with the RIS. The set of parameters may include a size of the STBC, a type of the STBC, timing information associated with transmission of RIS data (e.g., the data associated with the RIS to be transmitted via the STBC by modulating the reflected signal), or any combination thereof. Additionally, the network entity may transmit, to the RIS, a downlink signal (e.g., message) on which the RIS may encode the RIS data (e.g., the one or more information bits associated with the RIS) using the STBC (e.g., according to the set of parameters). As such, the RIS may reflect the downlink signal carrying the RIS data (e.g., including the one or more information bits) to the UE based on the set of parameters and the UE may receive the reflected signal. Additionally, the UE may identify the RIS data based on a detection procedure (e.g., based on using a detection algorithm) associated with the set of parameters.

Additionally, the network entity may adjust a size of the STBC based on a correlation metric associated with multiple channels further associated with the STBC. In other words, the RIS may be associated with a quantity of subregions, or channels, where each channel is associated with an STBC block of the STBC. As such, the network entity may transmit a set of reference signals via the RIS, where each reference signal is transmitted via a channel of the RIS. In such cases, the RIS may determine a correlation metric associated with the channels of the RIS and may transmit, to the network entity, a measurement report indicating the correlation metric. In some examples, the network entity may modify a size of the STBC, or size of the STBC blocks (e.g., further modifying the quantity of subregions of the RIS), based on the correlation metric. That is, the network entity may increase a size of the STBC, or decrease a size of the STBC blocks (e.g., increase the quantity of subregions) based on whether the correlation metric exceeds a threshold or not.

A method for wireless communications at a network entity is described. The method may include transmitting a first message indicating a set of parameters associated with a STBC from a set of multiple STBCs associated with a wireless node, where the set of parameters includes at least a size of the STBC and transmitting a second message on which the wireless node determines whether to encode one or more information bits according to the set of parameters associated with the STBC.s.

An apparatus for wireless communications at a network entity is described. The apparatus may include at least one processor, at least one memory coupled with the at least one processor, and instructions stored in the at least one memory. The instructions may be executable by the at least one processor to cause the apparatus to transmit a first message indicating a set of parameters associated with a STBC from a set of multiple STBCs associated with a wireless node, where the set of parameters includes at least a size of the STBC and transmit a second message on which the wireless node determines whether to encode one or more information bits according to the set of parameters associated with the STBC.s.

Another apparatus for wireless communications at a network entity is described. The apparatus may include means for transmitting a first message indicating a set of parameters associated with a STBC from a set of multiple STBCs associated with a wireless node, where the set of parameters includes at least a size of the STBC and means for transmitting a second message on which the wireless node determines whether to encode one or more information bits according to the set of parameters associated with the STBC.s.

A non-transitory computer-readable medium storing code for wireless communications at a network entity is described. The code may include instructions executable by a processor to transmit a first message indicating a set of parameters associated with a STBC from a set of multiple STBCs associated with a wireless node, where the set of parameters includes at least a size of the STBC and transmit a second message on which the wireless node determines whether to encode one or more information bits according to the set of parameters associated with the STBC.s.

In some examples of the method, apparatuses, and non-transitory computer-readable medium described herein, the STBC may be associated with a set of multiple channels and the method, apparatuses, and non-transitory computer-readable medium may include further operations, features, means, or instructions for transmitting, to the wireless node, a set of multiple reference signals, where the set of multiple reference signals may be transmitted via the set of multiple channels associated with the STBC.

Some examples of the method, apparatuses, and non-transitory computer-readable medium described herein may further include operations, features, means, or instructions for receiving, from the wireless node, a measurement report indicating a correlation metric associated with the set of multiple channels.

Some examples of the method, apparatuses, and non-transitory computer-readable medium described herein may further include operations, features, means, or instructions for transmitting a control message indicating a modification to the size of the STBC based on the correlation metric.

In some examples of the method, apparatuses, and non-transitory computer-readable medium described herein, the modification increases the size of the STBC based on the correlation metric exceeding a threshold.

In some examples of the method, apparatuses, and non-transitory computer-readable medium described herein, the modification decreases the size of the STBC based on the correlation metric failing to exceed a threshold.

Some examples of the method, apparatuses, and non-transitory computer-readable medium described herein may further include operations, features, means, or instructions for transmitting a control message indicating for the wireless node to transmit the measurement report, where transmitting the measurement report may be based on receiving the control message.

In some examples of the method, apparatuses, and non-transitory computer-readable medium described herein, the set of parameters include a type of the STBC, a start time associated with the wireless node reflecting the second message including the one or more encoded information bits, a stop time associated with the wireless node reflecting the second message including the one or more encoded information bits, or any combination thereof.

In some examples of the method, apparatuses, and non-transitory computer-readable medium described herein, the type of STBC includes a multi-symbol STBC type and the set of parameters further includes a pattern associated with transmitting the one or more information bits in a time domain.

In some examples of the method, apparatuses, and non-transitory computer-readable medium described herein, the first message may be a downlink control information message or a radio resource control message.

Some examples of the method, apparatuses, and non-transitory computer-readable medium described herein may further include operations, features, means, or instructions for transmitting, to a user equipment (UE), one or more reference signals within a threshold duration of transmitting the second message, where a channel used to transmit the one or more reference signals may be the same as a channel used to transmit the second message.

Some examples of the method, apparatuses, and non-transitory computer-readable medium described herein may further include operations, features, means, or instructions for receiving, from the wireless node, a third message indicating a capability of the wireless node to support encoding information bits via a space time code block, where the set of parameters it based on the capability of the wireless node.

In some examples of the method, apparatuses, and non-transitory computer-readable medium described herein, the third message indicates a threshold quantity of sub-regions associated with the wireless node and the size of the STBC may be based on the threshold quantity.

In some examples of the method, apparatuses, and non-transitory computer-readable medium described herein, the size of the STBC may be based on a quantity of sub-regions associated with the wireless node and each sub-region may be associated with a channel of a set of multiple channels associated with the wireless node.

A method for wireless communications at a wireless node is described. The method may include receiving, from a network entity, a first message indicating a set of parameters associated with a STBC from a set of multiple STBCs associated with the wireless node, where the set of parameters includes at least a size of the STBC, receiving, from the network entity, a second message on which the wireless node encodes one or more information bits according to the set of parameters associated with the STBC, and reflecting the second message to a UE based on the set of parameters, where the reflected second message includes the one or more encoded information bits.

An apparatus for wireless communications at a wireless node is described. The apparatus may include at least one processor, at least one memory coupled with the at least one processor, and instructions stored in the at least one memory. The instructions may be executable by the at least one processor to cause the apparatus to receive, from a network entity, a first message indicating a set of parameters associated with a STBC from a set of multiple STBCs associated with the wireless node, where the set of parameters includes at least a size of the STBC, receive, from the network entity, a second message on which the wireless node encodes one or more information bits according to the set of parameters associated with the STBC, and reflect the second message to a UE based on the set of parameters, where the reflected second message includes the one or more encoded information bits.

Another apparatus for wireless communications at a wireless node is described. The apparatus may include means for receiving, from a network entity, a first message indicating a set of parameters associated with a STBC from a set of multiple STBCs associated with the wireless node, where the set of parameters includes at least a size of the STBC, means for receiving, from the network entity, a second message on which the wireless node encodes one or more information bits according to the set of parameters associated with the STBC, and means for reflecting the second message to a UE based on the set of parameters, where the reflected second message includes the one or more encoded information bits.

A non-transitory computer-readable medium storing code for wireless communications at a wireless node is described. The code may include instructions executable by a processor to receive, from a network entity, a first message indicating a set of parameters associated with a STBC from a set of multiple STBCs associated with the wireless node, where the set of parameters includes at least a size of the STBC, receive, from the network entity, a second message on which the wireless node encodes one or more information bits according to the set of parameters associated with the STBC, and reflect the second message to a UE based on the set of parameters, where the reflected second message includes the one or more encoded information bits.

In some examples of the method, apparatuses, and non-transitory computer-readable medium described herein, the STBC may be associated with a set of multiple channels and the method, apparatuses, and non-transitory computer-readable medium may include further operations, features, means, or instructions for receiving a set of multiple reference signals, where the set of multiple reference signals may be transmitted via the set of multiple channels associated with the STBC.

Some examples of the method, apparatuses, and non-transitory computer-readable medium described herein may further include operations, features, means, or instructions for transmitting a measurement report indicating a correlation metric associated with the set of multiple channels.

Some examples of the method, apparatuses, and non-transitory computer-readable medium described herein may further include operations, features, means, or instructions for receiving a control message indicating a modification to the size of the STBC based on the correlation metric.

In some examples of the method, apparatuses, and non-transitory computer-readable medium described herein, the modification increases the size of the STBC based on the correlation metric exceeding a threshold.

In some examples of the method, apparatuses, and non-transitory computer-readable medium described herein, the modification decreases the size of the STBC based on the correlation metric failing to exceed a threshold.

Some examples of the method, apparatuses, and non-transitory computer-readable medium described herein may further include operations, features, means, or instructions for receiving a control message indicating for the wireless node to transmit the measurement report, where transmitting the measurement report may be based on receiving the control message.

In some examples of the method, apparatuses, and non-transitory computer-readable medium described herein, the set of parameters include a type of the STBC, a start time associated with the wireless node reflecting the second message including the one or more encoded information bits, a stop time associated with the wireless node reflecting the second message including the one or more encoded information bits, or any combination thereof.

In some examples of the method, apparatuses, and non-transitory computer-readable medium described herein, the type of STBC includes a multi-symbol STBC type and the set of parameters further includes a pattern associated with transmitting the one or more information bits in a time domain.

In some examples of the method, apparatuses, and non-transitory computer-readable medium described herein, the first message may be a downlink control information message or a radio resource control message.

Some examples of the method, apparatuses, and non-transitory computer-readable medium described herein may further include operations, features, means, or instructions for transmitting a third message indicating a capability of the wireless node to support encoding information bits via a space time code block, where the set of parameters it based on the capability of the wireless node.

In some examples of the method, apparatuses, and non-transitory computer-readable medium described herein, the third message indicates a threshold quantity of sub-regions associated with the wireless node and the size of the STBC may be based on the threshold quantity.

In some examples of the method, apparatuses, and non-transitory computer-readable medium described herein, the size of the STBC may be based on a quantity of sub-regions associated with the wireless node and each sub-region may be associated with a channel of a set of multiple channels associated with the wireless node.

A method for wireless communications at a UE is described. The method may include receiving, from a network entity, a first message indicating a set of parameters associated with a STBC from a set of multiple STBCs associated with a wireless node, where the set of parameters includes at least a size of the STBC and receiving, from the wireless node, a second message including one or more information bits associated with the wireless node, where the UE identifies the one or more information bits based on a detection procedure associated with the set of parameters.

An apparatus for wireless communications at a UE is described. The apparatus may include at least one processor, at least one memory coupled with the at least one processor, and instructions stored in the at least one memory. The instructions may be executable by the at least one processor to cause the apparatus to receive, from a network entity, a first message indicating a set of parameters associated with a STBC from a set of multiple STBCs associated with a wireless node, where the set of parameters includes at least a size of the STBC and receive, from the wireless node, a second message including one or more information bits associated with the wireless node, where the UE identifies the one or more information bits based on a detection procedure associated with the set of parameters.

Another apparatus for wireless communications at a UE is described. The apparatus may include means for receiving, from a network entity, a first message indicating a set of parameters associated with a STBC from a set of multiple STBCs associated with a wireless node, where the set of parameters includes at least a size of the STBC and means for receiving, from the wireless node, a second message including one or more information bits associated with the wireless node, where the UE identifies the one or more information bits based on a detection procedure associated with the set of parameters.

A non-transitory computer-readable medium storing code for wireless communications at a UE is described. The code may include instructions executable by a processor to receive, from a network entity, a first message indicating a set of parameters associated with a STBC from a set of multiple STBCs associated with a wireless node, where the set of parameters includes at least a size of the STBC and receive, from the wireless node, a second message including one or more information bits associated with the wireless node, where the UE identifies the one or more information bits based on a detection procedure associated with the set of parameters.

In some examples of the method, apparatuses, and non-transitory computer-readable medium described herein, the set of parameters include a type of the STBC, a start time associated with receiving the second message including the one or more information bits, a stop time associated with receiving the second message including the one or more information bits, or any combination thereof.

In some examples of the method, apparatuses, and non-transitory computer-readable medium described herein, the type of STBC includes a multi-symbol STBC type and the set of parameters further includes a pattern associated with transmitting the one or more information bits in a time domain.

In some examples of the method, apparatuses, and non-transitory computer-readable medium described herein, the first message may be a downlink control information message or a radio resource control message.

Some examples of the method, apparatuses, and non-transitory computer-readable medium described herein may further include operations, features, means, or instructions for receiving one or more reference signals within a threshold duration of receiving the second message, where a channel used to transmit the one or more reference signals may be the same as a channel used to transmit the second message.

Some examples of the method, apparatuses, and non-transitory computer-readable medium described herein may further include operations, features, means, or instructions for estimating the channel based on receiving the one or more reference signals, where the detection procedure may be based on the channel estimation.

In some examples of the method, apparatuses, and non-transitory computer-readable medium described herein, the size of the STBC may be based on a quantity of sub-regions associated with the wireless node and each sub-region may be associated with a channel of a set of multiple channels associated with the wireless node.

In some examples of the method, apparatuses, and non-transitory computer-readable medium described herein, the detection procedure includes a maximum likelihood detector, a low-complexity detector, or any combination thereof.

BRIEF DESCRIPTION OF THE DRAWINGS

FIGS. 12 through 14 show flowcharts illustrating methods that support information transfer via channel-adaptive STBCs over RISs in accordance with one or more aspects of the present disclosure.

DETAILED DESCRIPTION

Figure 1:
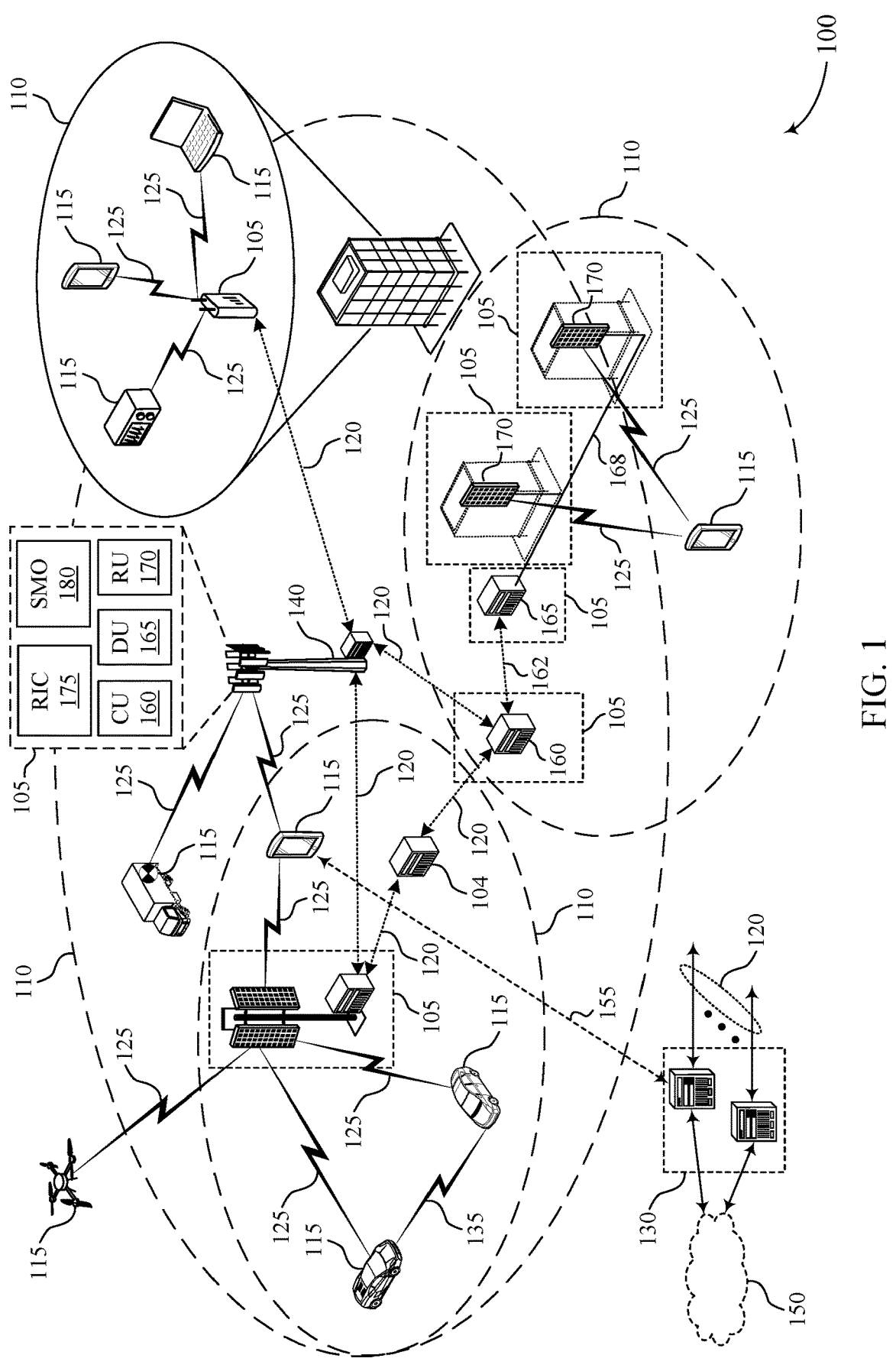
FIG. 1 shows an example of a wireless communications system that supports information transfer via channel-adaptive space time block codes (STBCs) over reconfigurable intelligent surfaces (RISs) in accordance with one or more aspects of the present disclosure.

Some wireless communications systems may support reconfigurable intelligent surfaces (RISs). An RIS may be a near passive device that may reflect communications from a first wireless device, such as a network entity, to a second wireless device, such as a user equipment (UE), at an indicated direction. In some examples, to support interference management, improved positioning, and link failure early detection, among other capabilities, the RIS may encode a set of information bits associated with the RIS onto a signal received from the first wireless device (e.g., a reflected signal), which may be referred to as passive beamforming and information transfer (PBIT). However, current techniques for performing PBIT may be limited.

Generally, the techniques described herein may enable PBIT using space time block codes (STBCs). For example, a network entity may transmit an indication of an STBC from multiple STBCs associated with a RIS, such that the RIS may perform PBIT using the indicated STBC. For example, an RIS may be associated with multiple antennas or antenna arrays that may be portioned into a quantity of subregions, where the quantity of subregions is based on a size of an STBC. In other words, the STBC may include a quantity of STBC blocks (e.g., based on the size of the STBC) and each STBC block may correspond to a subregion of the RIS. Additionally, the quantity of subregions may be reconfigurable, such that the RIS may support multiple sizes of STBCs (e.g., multiple STBCs). As such, a network entity may transmit, to the RIS, an indication of a set of parameters associated with an STBC from the multiple STBCs supported by the RIS, such that the RIS may perform PBIT using the indicated RIS. In such cases, the set of parameters may include a type of the STBC, a size of the STBC, timing information associated with performing the PBIT, or any combination thereof. Thus, the RIS may receive a signal from the network entity and may encode one or more information bits associated with the RIS, which may be referred to as RIS data, onto the received signal using the indicated STBC, reflecting the signal, including the one or more information bits, to a UE. Additionally, the network entity may transmit the indication of the set of parameters to the UE, such that the UE may identify the one or more information bits based on the set of parameters.

Additionally, the network entity may adjust the size of the STBC (e.g., adjust the STBC block size) based on a channel correlation. In other words, the network entity may transmit multiple reference signals via the RIS, where each reference signal is transmitted via a subregion, or channel, of the RIS. As such, the RIS may measure correlation between each subregion of the RIS and may transmit an indication of the correlation, such as via a correlation metric, to the network entity, such that the network entity may adjust the size of the STBC based on the correlation.

Aspects of the disclosure are initially described in the context of wireless communications systems. Aspects are then described in the context of a process flow. Aspects of the disclosure are further illustrated by and described with reference to apparatus diagrams, system diagrams, and flowcharts that relate to information transfer via channel-adaptive space time block codes over reconfigurable intelligent surfaces.

FIG. 1 shows an example of a wireless communications system 100 that supports information transfer via channel-adaptive STBCs over RISs in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support information transfer via channel-adaptive STBCs over RISs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may support PBIT using STBCs. For example, a network entity 105 may transmit an indication of an STBC from multiple STBCs associated with a RIS, such that the RIS may perform PBIT using the indicated STBC. That is, an RIS may be associated with multiple antennas or antenna arrays that may be portioned into a quantity of subregions, where the quantity of subregions is based on a size of an STBC. In other words, the STBC may include a quantity of STBC blocks (e.g., based on the size of the STBC) and each STBC block may correspond to a subregion of the RIS. Additionally, the quantity of subregions may be reconfigurable, such that the RIS may support multiple sizes of STBCs (e.g., multiple STBCs). As such, a network entity 105 may transmit, to the RIS, an indication of a set of parameters associated with an STBC from the multiple STBCs supported by the RIS, such that the RIS may perform PBIT using the indicated RIS. In such cases, the set of parameters may include a type of the STBC, a size of the STBC, timing information associated with performing the PBIT, or any combination thereof. Thus, the RIS may receive a signal from the network entity 105 and may encode one or more information bits associated with the RIS onto the received signal using the indicated STBC, reflecting the signal, including the one or more information bits, to a UE 115. Additionally, the network entity 105 may transmit the indication of the set of parameters to the UE 115, such that the UE 115 may identify the one or more information bits based on the set of parameters.

Additionally, the network entity 105 may adjust the size of the STBC (e.g., adjust the STBC block size) based on a channel correlation. In other words, the network entity 105 may transmit multiple reference signals via the RIS, where each reference signal is transmitted via a subregion, or channel, of the RIS. As such, the RIS may measure correlation between each subregion, or channel, of the RIS and may transmit an indication of the correlation, such as via a correlation metric, to the network entity 105, such that the network entity 105 may adjust the size of the STBC based on the correlation.

Figure 2:
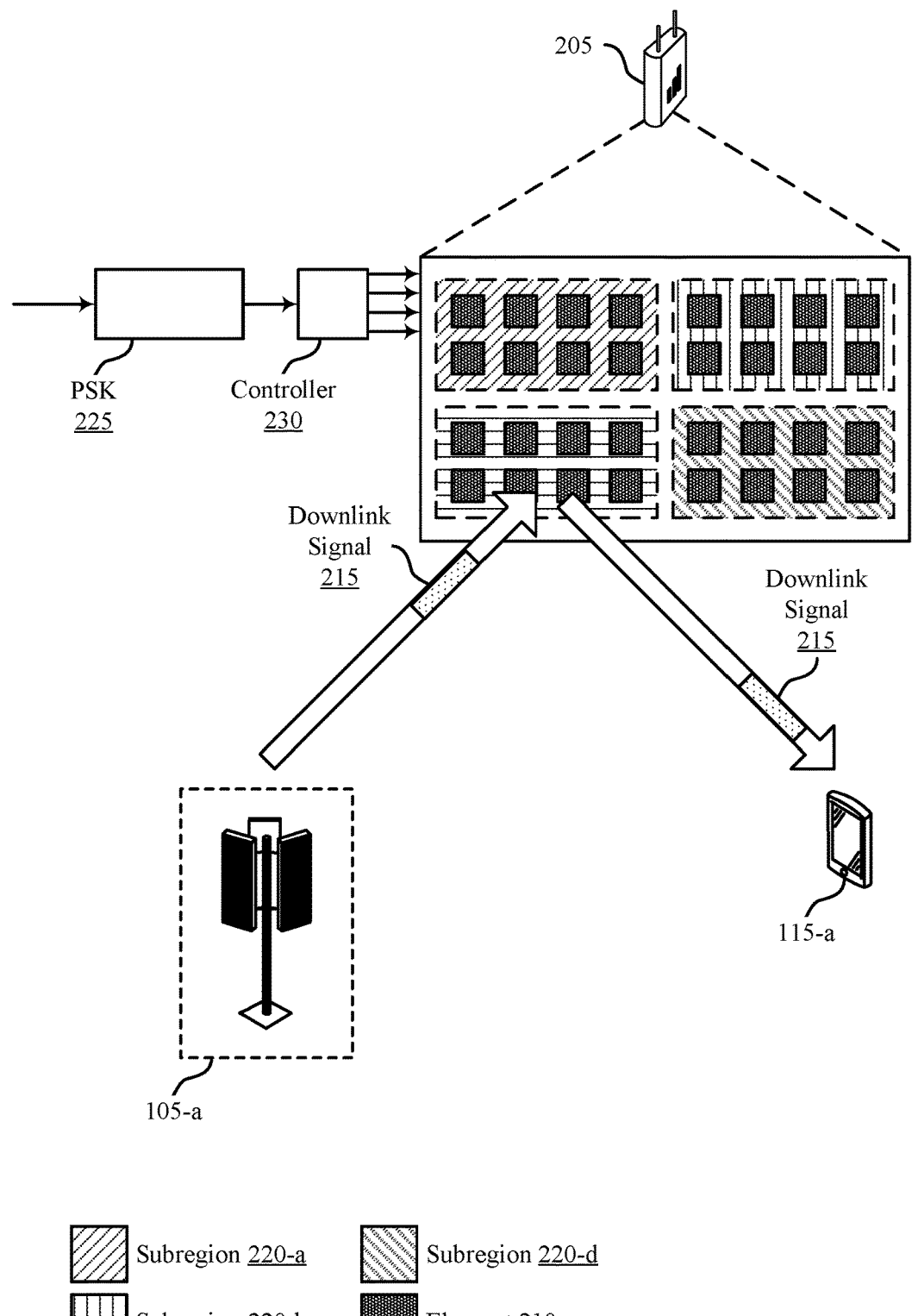
FIG. 2 shows an example of a wireless communications system that supports information transfer via channel-adaptive STBCs over RISs in accordance with one or more aspects of the present disclosure.

FIG. 2 shows an example of a wireless communications system 200 that supports information transfer via channel-adaptive STBCs over RISs in accordance with one or more aspects of the present disclosure. The wireless communications system 200 may implement or be implemented by aspects of the wireless communications system 100. For example, the wireless communications system 200 may include one or more network entities 105 (e.g., a network entity 105-*a*) and one or more UEs 115 (e.g., a UE 115-*a*), which may represent examples of corresponding devices as described with reference to FIG. 1. In some examples, the network entity 105-*a* may communicate with the UE 115-*a* via an RIS 205, where the RIS 205 performs PBIT using one or more communications from the network entity 105-a.

Some wireless communications systems, such as the wireless communications system 200, may support one or more RISs 205. A RIS 205 may be a wireless device including an array of passive and reconfigurable elements (e.g., all or majority of the reconfigurable elements may be passive, or without any amplification), which may be referred to as elements 210, that may reflect communications from a first wireless device, such as the network entity 105-a, to a second wireless device, such as the UE 115-a (e.g., at an indicated direction). That is, the network entity 105-a, may transmit, receive, or both, communications (e.g., to, from, or both, the UE 115-a) via the RIS 205 to extend a coverage area of the network entity 105-a (e.g., with negligible power consumption and/or with limited or no transmit capabilities of the RIS 205). For example, the network entity 105-a may communicate with the UE 115-a via first path (e.g., communication link), however, a blockage may interfere with (e.g., block) the first path, such that the network entity 105-a may avoid (e.g., circumvent) the blockage by communicating with the UE 115-a via the RIS 205 (e.g., via a new multi-path, via a cascaded communication link). In such cases, the network entity 105-a may indicate, to the RIS 205, a direction at which to reflect the downlink communications (e.g., reflection direction may be controlled by the network entity 105-a).

In some cases, the RIS 205 may encode one or more information bits (e.g., data bits) associated with the RIS 205, such an information associated with an identity of the RIS 205, maintenance results, sensor information, or the like thereof, onto a downlink signal 215 (e.g., a reflected signal) received from the network entity 105-a to support one or more capabilities. The one or more information bits associated with the RIS 205 may be referred to as RIS data. Encoding of the one or more information bits onto the downlink signal 215 and reflection (e.g., transmission) of the downlink signal 215 including the one or more encoded information bits may be referred to as PBIT.

For example, due to interference, the UE 115-a may receive an additional downlink signal 215 from an additional RIS 205, where the UE 115-a is not an intended recipient of the additional downlink signal 215. As such, the additional downlink signal 215 may include one or more information bits associated with an identity of the additional RIS 205, such that the UE 115 may determine that the UE 115-a was not an intended recipient of the additional downlink signal 215 (e.g., perform interference management).

Additionally, or alternatively, the UE 115-a may receive one or more first reference signals (e.g., positioning reference signals (PRSs)) directly from the network entity 105-a (e.g., not via the RIS 205), as well as one or more second reference signals from the network entity 105-a via the RIS 205. In such cases, the UE 115-a may not be aware that the one or more second reference signals were received via the RIS 205 and may incorrectly perform a positioning procedure (e.g., based on assuming the one or more second reference signals were received directly from the network entity 105-a). As such, the RIS 205 may encode one or more information bits associated with the RIS 205 onto the one or more second reference signals such that the UE 115-a may identify that the one or more second reference signals were received via the RIS 205 (e.g., and not use them to perform the positioning procedure).

Additionally, or alternatively, the RIS 205 may detect an upcoming failure in the communication link between the network entity 105-a and the UE 115-a via the RIS 205 (e.g., via the cascaded communication link) and may turn off one or more elements 210 on the RIS 205. In such cases, the RIS 205 may encode one or more information bits indicating the upcoming failure on a downlink signal 215 to be reflected to the UE 115-a, such that the UE 115-a may identify the one or more information bits and transmit an indication of the upcoming failure to the network entity 105-a (e.g., for link failure early detection). However, conventional techniques for encoding information bits onto reflected signals (e.g., for implementing PBIT) may be limited.

Accordingly, the wireless communications system 200 may support transmit-diversity techniques for implementing PBIT, as described herein. That is, techniques described herein may enable the RIS 205 to use STBCs (e.g., a transmit-diversity scheme for MIMO over multiple symbol slots) to encode one or more information bits associated with the RIS 205 (e.g., RIS data to be transmitted via the STBC by modulating the downlink signal 215) onto a downlink signal 215 (e.g., in a channel-adaptive fashion)

For example, the RIS 205 may include a total quantity of elements 210 (e.g., N) that may reflect communications, such as downlink signals 215, from the network entity 105-a to the UE 115-a. Additionally, the elements 210 of the RIS 205 may be partitioned into a quantity of subregions 220, such as a subregion 220-a, a subregion 220-b, a subregion 220-c, and a subregion 220-d, where each subregion 220 includes an equal quantity of elements 210 (e.g.

$$\frac{N}{\text{quantity of subregions}}).$$

Additionally, the quantity of subregions 220 of the RIS 205 may be equal to a quantity (e.g., number) of STBC blocks of (e.g., associated with) an STBC. For example, an STBC of size 4×4 may include 4 STBC blocks such that the RIS 205 is partitioned into 4 subregions 220 (e.g., as depicted in FIG. 2). In another example, an STBC of size 2×2 may include 2 STBC blocks such that the RIS 205 is partitioned into 2 subregions 220 (e.g., not depicted). In another example, an STBC of size 8×8 may include 8 STBC blocks such that the RIS 205 is partitioned into 8 subregions 220 (e.g., not depicted). In other words, a quantity of columns in the STBC (e.g., STBC matrix). Additionally, each subregion 220, or SBTC block, may represent a channel.

Additionally, each subregion 220 may be associated with a phase shift, $\theta_i$, that is common (e.g., the same) over the elements 210 of the respective subregion 220. For example, the subregion 220-a may be associated with a first phase shift, $\theta_1$, the subregion 220-b may be associated with a second phase shift, $\theta_2$, the subregion 220-c may be associated with a third phase shift, $\theta_3$, and the subregion 220-d may be associated with a fourth phase shift, $\theta_4$. Each phase shift may be based on a configuration associated with the RIS 205 (e.g., indication from the network entity 105-a).

As such, for each symbol within an STBC, each subregion 220 may be associated (e.g., configured) with a phase shift to produce an STBC pattern (e.g., associated with the STBC). For example, the RIS 205 may identify a set of information bits to encode on a downlink signal 215. As such, the RIS 205 may input the set of information bits into a phase shift key (PSK) 225 to generate a set of modulated symbols, where each modulated symbol, $s_i$, of the set of symbols is calculated according to the following Equation 1:

$$s_i = e^{j\theta_i}, i = 1, 2, 3, 4 \ldots n \tag{1}$$

where a quantity of the set of modulated symbols is based on a size of the STBC (e.g., a quantity of STBC blocks of the STBC or a quantity of the subregions 220 of the RIS 205). In such cases, the parameter n may represent a quantity of STBC blocks of the STBC or a quantity of the subregions 220 of the RIS 205, the parameter $\theta_3$, may represent the phase shift for each STBC block or subregion 220, and the parameter j may represent an imaginary number (e.g., $\sqrt{-1}$). For example, for an STBC of size 4×4, the RIS 205 may generate a first modulated symbol, $s_1$, based on the first phase shift, $\theta_1$, associated with the subregion 220-*a*, a second modulated symbol, $s_2$, based on the second phase shift, $\theta_2$, associated with the subregion 220-*b*, a third modulated symbol, $s_3$, based on the third phase shift, $\theta_3$, associated with the subregion 220-*c*, and a fourth modulated symbol, $s_4$, based on the fourth phase shift, $\theta_4$, associated with the subregion 220-*d*. The set of modulated symbols may be input in a controller 230 of the RIS 205 to generate the SBTC (e.g., SBTC matrix). For example, continuing with the example in FIG. 2, the controller 230 may generate the following 4×4 SBTC:

$$
\begin{bmatrix}
s_1 & s_2 & s_3 & s_4 \\
-s_2^* & s_1^* & -s_4^* & s_3^* \\
s_3 & s_4 & s_1 & s_2 \\
-s_4^* & s_3^* & -s_2^* & s_1^*
\end{bmatrix}
\rightarrow
\begin{bmatrix}
\theta_1 & \theta_2 & \theta_3 & \theta_4 \\
-\theta_2+\pi & -\theta_1 & -\theta_4+\pi & -\theta_3 \\
\theta_3 & \theta_4 & \theta_1 & \theta_2 \\
-\theta_4+\pi & -\theta_3 & -\theta_{2+\pi} & -\theta_1
\end{bmatrix}
$$

where each column of the SBTC corresponds to a subregion 220 (e.g., associated with a respective phase) in an antenna domain (e.g., space) and each column corresponds to a slot in a time domain. That is, in a first time slot the RIS 205 may transmit each symbol of the first row of the SBTC using the respective subregions 220, in a second time slot the RIS 205 may transmit each symbol of the second row of the SBTC using the respective subregions 220, in a third time slot the RIS 205 may transmit each symbol of the third row of the SBTC using the respective subregion 220, and in a fourth time slot the RIS 205 may transmit each symbol of the fourth row of the SBTC using the respective subregion 220. In some examples, the time slots may be adjacent (e.g., sequential) while, in some other examples, the time slots may be associated with a pattern (e.g., the STBC may not be transmitted using adjacent OFDM symbols).

In some examples, the network entity 105-*a* may transmit, to the RIS 205 and the UE 115-*a*, an indication of an STBC from a set of STBCs associated with the RIS 205. That is, as described previously, the RIS 205 may support a set of STBCs, where each STBC may be associated with an STBC type, an STBC block size, timing information, or any combination thereof. As such, the network entity 105-*a* may transmit a control message (e.g., dynamically via DCI message or semi-statically over RRC message) indicating a selected (e.g., pre-selected) STBC from the set of STBCs supported by the RIS 205. In such cases, the control message may include a set of parameters associated with the selected STBC including one or more of an STBC type associated with the selected STBC, an STBC block size (e.g., STBC size) associated with the selected STBC, and timing information associated with the selected STBC. The timing information, which may also be referred to as PBIT timing, may include a start time (e.g., initial time) associated with transmitting the symbols of the STBC (e.g., a first row of the STBC), an end time associated with transmitting the symbols of the STBC (e.g., a last row of the STBC), or both. In other words, the PBIT timing may indicate a start time, an end time, or both, associated with implementing PBIT via the selected STBC (e.g., indicate a PBIT occasion). Additionally, or alternatively, the control message may indicate if the STBC (e.g., multi-symbol SBTC) may be implemented using a pattern over time. In other words, as described previously, the RIS 205 may transmit the SBTC (e.g., each row of the STBC) via non-consecutive symbols, or slots, in a time domain.

In some examples, the RIS 205 may transmit, to the network entity 105-*a*, a capability message indicating a threshold (e.g., maximum) quantity of subregions 220 supported by the RIS 205 (e.g., that can be produced and managed by the RIS 205), such that the set of parameters may be based on a capability of the RIS 205 as indicated in the capability message.

Additionally, the UE 115-*a* may receive a downlink signal 215 including the STBC (e.g., SBTC symbols) according to the PBIT timing (e.g., in a PBIT timing window) and may decode the STBC using the symbols generated by the controller 230. In other words, the UE 115-*a* may identify (e.g., detect) the one or more information bits associated with the RIS 205 using a maximum likelihood (ML) detector, a low-complexity detector (e.g., if known by the UE 115-*a*), or the like thereof (e.g., as part of a detection procedure), where the ML detector, the low-complexity detector, or the like thereof, is based on the set of parameters associated with the STBC.

In some examples, the downlink signal 215 may not include data from the network entity 105-*a*. In such cases, the UE 115-*a* may decode the STBC (e.g., only the STBC) to identify the one or more information bits associated with the RIS 205. Additionally, or alternatively, the network entity 105-*a* may transmit one or more reference signals (e.g., pilots, demodulation reference signals (DMRSs) in one or more time slots within a threshold duration of transmission of the STBC (e.g., in respective time slots close to a PBIT occasion such that the UE 115-*a* may estimate a channel (e.g., perform a channel estimation procedure) to be used in the ML detector, the low-complexity detector, or the like thereof. That is, the UE 115-*a* may perform channel estimation based on the one or more reference signals and may use the channel estimation to configure the ML detector, the low-complexity detector, or the like thereof.

Additionally, the network entity 105-*a* may adjust the STBC block size based on one or more measurements associated with a quality of the channels of the STBC (e.g., associated with each subregion 220). That is, an order of diversity may increase with an increase in the STBC block size (e.g., for rich-scattering environments), such that an STBC with a larger STBC block size may be advantageous at a higher signal to noise ratio (SINR) (e.g., as compared to an STBC with a smaller STBC block size). However, larger STBC block sizes may result in the RIS 205 being partitioned into more subregions 220 (e.g., as compared to smaller STBC block sizes), which may result in the subregions experiencing channel correlation (e.g., correlated channel statistics) which may result impacts to the order of diversity (e.g., targeted diversity order). In other words, a trade off may exist between SNR and order of diversity.

As such, the network entity 105-*a* may transmit a second control message indicating one or more resources (e.g., uplink resources or downlink resources) associated with transmitting one or more reference signals (e.g., channel state information reference signals (CSI-RSs) or sounding reference signals (SRSs) to the RIS 205 such that the RIS 205 may measure a correlation between the channels (e.g., each subregion 220) of the RIS 205. That is, the network entity 105-*a* may transmit the one or more reference signals to the RIS 205 and the RIS 205 may measure one or more channel correlation metrics (e.g., channel quality metrics) associated with the channels of the RIS 205 based on the one or more reference signals. Additionally, the RIS 205 may transmit, to the network entity 105-*a*, a measurement report indicating the one or more channel correlation metrics. In some examples, the network entity 105-*a* may transmit an additional control message (e.g., dynamically via DCI message or semi-statically via RRC message) indicating for the RIS 205 to measure the one or more channel correlation metrics (e.g., the network entity 105-*a* may take use statistical information on the channel correlation available a priori as an input).

In some examples, the one or more channel correlation metrics (e.g., measurement results across the subregions 220) may exceed a threshold associated with the STBC block size (e.g., indicate high correlation) and the RIS 205 may repeat the measurement of the one or more channel correlation metrics for larger subregions (e.g., a smaller quantity of subregions 220 or a smaller STBC block size). As such, the network entity 105-*a* may modify a size of the STBC (e.g., an STBC block size), such that one or more channel correlation metrics associated with the STBC are below the threshold. In other words, the network entity 105-*a* may transmit, to the RIS 205 and the UE 115-*a*, an additional control message indicating a new STBC, where a size of the new STBC is associated with one or more channel correlation metrics that are below the threshold (e.g., based on receiving a measurement report from the RIS 205 indicating the one or more channel correlation metrics). In some examples, the new STBC may be associated with a higher diversity gain (e.g., than the configured STBC), however, a change in SNR may be below a threshold due to an initial level of the SNR (e.g., the SNR being low), and the network entity 105-*a* may refrain from indicating the new STBC. Conversely, the one or more channel correlation metrics associated with a current (e.g., configured) size of the STBC may be below the threshold, such that the network entity 105-*a* may refrain from modifying the size of the STBC or may decrease the size of the STBC.

Figure 3:
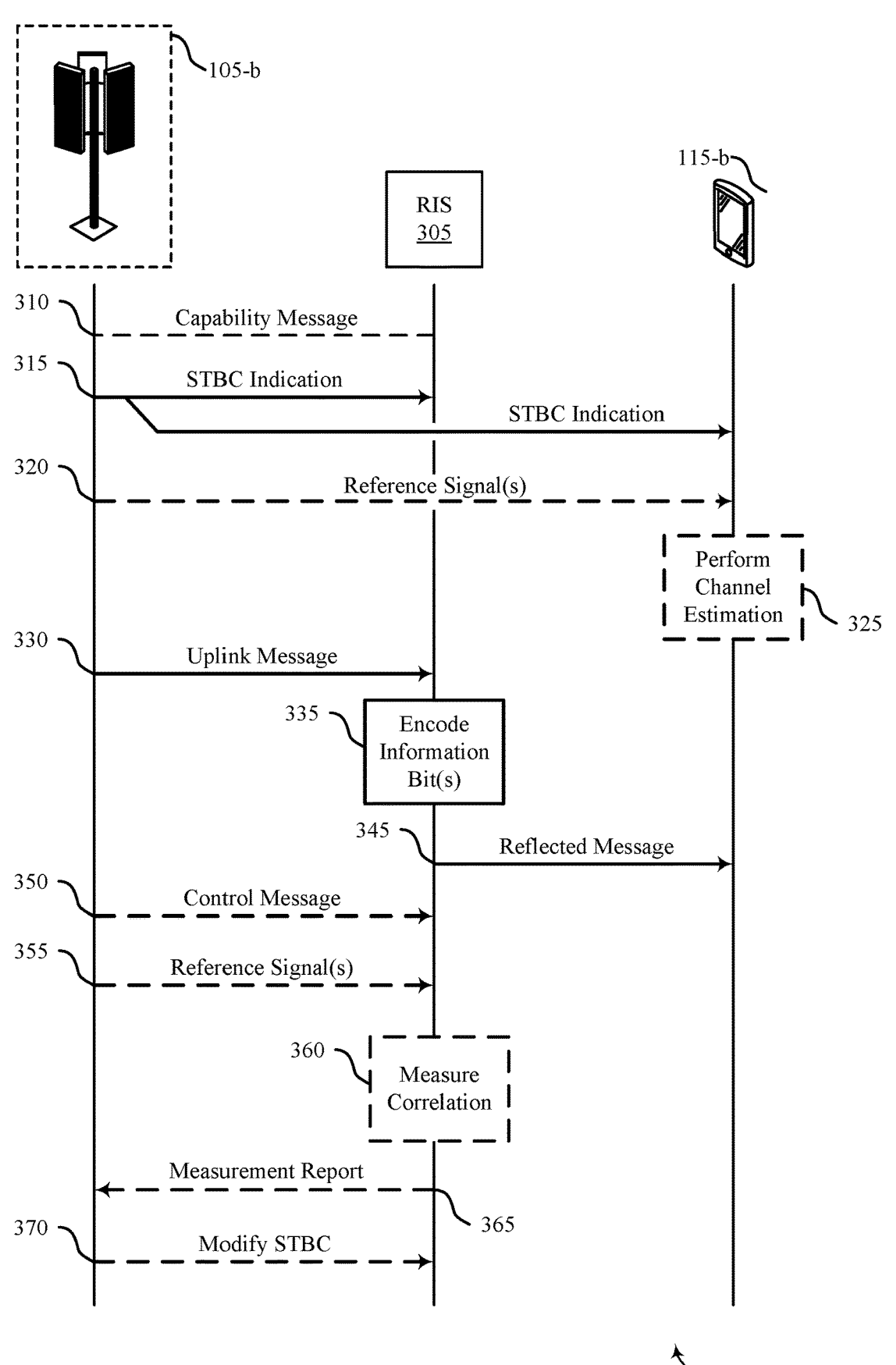
FIG. 3 shows an example of a process flow that supports information transfer via channel-adaptive STBCs over RISs in accordance with one or more aspects of the present disclosure.

FIG. 3 shows an example of a process flow 300 that supports information transfer via channel-adaptive STBCs over RISs in accordance with one or more aspects of the present disclosure. The process flow 300 may implement or be implemented by aspects of the wireless communications system 100 or the wireless communications system 200. For example, the process flow 300 may include one or more network entities 105 (e.g., a network entity 105-*b*) and one or more UEs 115 (e.g., a UE 115-*b*), which may represent examples of corresponding devices as described with reference to FIG. 1. In some examples, the network entity 105-*b* may communicate with the UE 115-*b* via an RIS 305, where the RIS 305 performs PBIT using one or more communications from the network entity 105-*b*.

In some cases, at 310, the RIS 305 may transmit, to network entity 105-*b*, a capability message (e.g., a first message) indicating a capability of the RIS 305 to support encoding information bits via an SBTC (e.g., to support PBIT using SBTCs). The capability message may indicate a threshold (e.g., maximum) quantity of sub-regions supported by the RIS 305. In other words, the capability message may indicate a threshold STBC block size based on an STBC block size being based on a quantity of subregions of the RIS 305.

At 315, the network entity 105-*b* may transmit, to the RIS 305 and the UE 115-*b*, a second message (e.g., control message, such as a DCI message or RRC message) indicating a set of parameters associated with an STBC from a set of STBCs supported by the RIS 305 (e.g., indicating an STBC configuration). The set of parameters may include a size of the STBC, a type of the STBC, a start time associated with the wireless node reflecting the second message comprising the one or more encoded information bits, a stop time associated with the wireless node reflecting the second message comprising the one or more encoded information bits, or any combination thereof. In some examples, the type of STBC may include a multi-symbol STBC type. In such cases, the set of parameters may further include a pattern associated with transmitting one or more information bits associated with the RIS 305 in a time domain (e.g., associated with implementing PBIT).

In some examples, at 320, the network entity 105-*b* may transmit, to the UE 115-*b*, one or more first reference signals within a threshold duration of transmitting a third message on which the RIS 305 may encode (e.g., may determine to encode) one or more information bits according to the set of parameters associated with the STBC. The channel (e.g., subregion of the RIS 305) used to transmit the one or more first reference signals may be the same as a channel used to transmit the third message.

As such, at 325, the UE 115-*b* may estimate the channel based on receiving the one or more first reference signals.

At 330, the network entity 105-*b* may transmit, to the RIS 305, the third message on which the RIS 305 may encode the one or more information bits according to the set of parameters associated with the STBC (e.g., may implement PBIT).

At 335, the RIS 305 may encode the one or more information bits onto the third message according to the set of parameters associated with the STBC and, at 345, may reflect (e.g., transmit) the third message to the UE 115-*b* based on the set of parameters. The UE 115-*b* may receive the third message including the one or more information bits associated with the RIS 305 and may identify (e.g., detect) the one or more information bits based on a detection procedure (e.g., detection algorithm) associated with the set of parameters. That is, the detection procedure may include an ML detector, a low-capacity detector, or the like thereof. Additionally, or alternatively, the detection procedure may be based on the channel estimation performed by the UE 115-*b*.

In some examples, at 350, the RIS 305 may receive, from the network entity 105-*b*, a first control message indicating for the RIS 305 to transmit a measurement report based on receiving a set of second reference signals.

As such, at 355, the RIS 305 may receive, from the network entity 105-*b*, the set of second reference signals, where the set of reference signals are transmitted via a set of channels associated with the STBC. In other words, the STBC may be associated with multiple STBC blocks, where a quantity of the STBC blocks is based on the size of the STBC. Additionally, the RIS 305 may be partitioned into a quantity of subregions, where the quantity of subregions is based on the quantity of STBC blocks (e.g., the size of the STBC). As such, each subregion may be associated with a channel of the set of channels.

In some examples, at 360, the RIS 305 may measure correlation between each channel of the set of channels to generate one or more correlation metrics associated with the set of channels and, at 365, may transmit, to the network entity 105-*b*, a measurement report indicating the one or more channel metrics associated with the set of channels.

In some cases, at 370, the network entity 105-*b* may transmit a second control message indicating a modification to the size of the STBC (e.g., modifying the quantity of subregions of the RIS 305) based on the one or more correlation metrics. For example, the modification may increase the size of the STBC based on the one or more correlation metrics exceeding a threshold. Conversely, the modification may decrease the size of the STBC based on the one or more correlation metrics failing to exceed the threshold.

Figure 4:
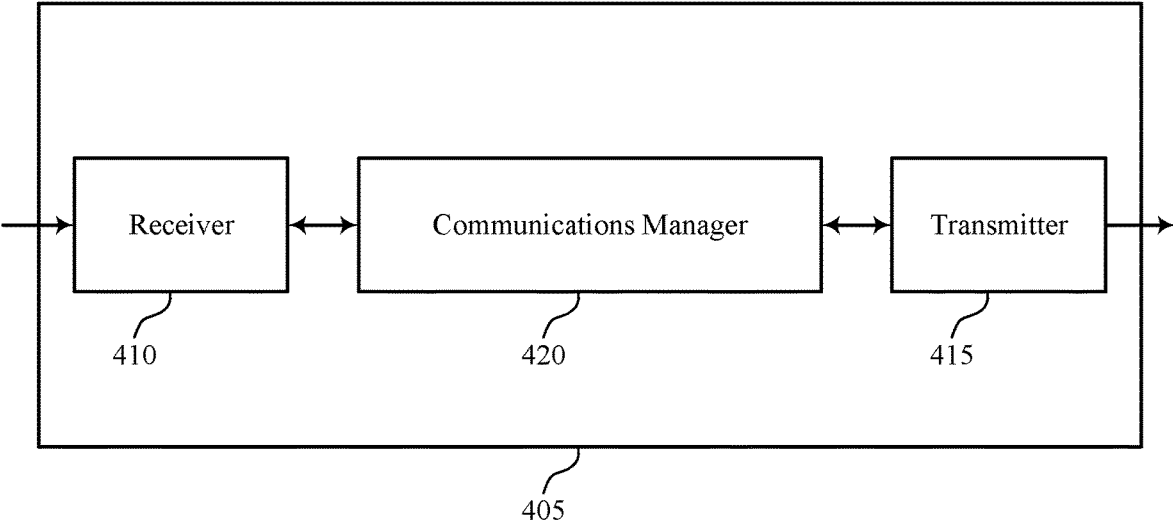
FIGS. 4 and 5 show block diagrams of devices that support information transfer via channel-adaptive STBCs over RISs in accordance with one or more aspects of the present disclosure.

FIG. 4 shows a block diagram 400 of a device 405 that supports information transfer via channel-adaptive STBCs over RISs in accordance with one or more aspects of the present disclosure. The device 405 may be an example of aspects of a network entity 105 as described herein. The device 405 may include a receiver 410, a transmitter 415, and a communications manager 420. The device 405 may also include a processor. Each of these components may be in communication with one another (e.g., via one or more buses).

The receiver 410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 405. In some examples, the receiver 410 may support obtaining information by receiving signals via one or more antennas. Additionally, or alternatively, the receiver 410 may support obtaining information by receiving signals via one or more wired (e.g., electrical, fiber optic) interfaces, wireless interfaces, or any combination thereof.

The transmitter 415 may provide a means for outputting (e.g., transmitting, providing, conveying, sending) information generated by other components of the device 405. For example, the transmitter 415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 415 may support outputting information by transmitting signals via one or more antennas. Additionally, or alternatively, the transmitter 415 may support outputting information by transmitting signals via one or more wired (e.g., electrical, fiber optic) interfaces, wireless interfaces, or any combination thereof. In some examples, the transmitter 415 and the receiver 410 may be co-located in a transceiver, which may include or be coupled with a modem.

The communications manager 420, the receiver 410, the transmitter 415, or various combinations thereof or various components thereof may be examples of means for performing various aspects of information transfer via channel-adaptive STBCs over RISs as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, at least one processor and at least one memory coupled with the at least one processor may be configured to perform one or more of the functions described herein (e.g., by executing, by the at least one processor, instructions stored in the at least one memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications at a network entity in accordance with examples as disclosed herein. For example, the communications manager 420 is capable of, configured to, or operable to support a means for transmitting a first message indicating a set of parameters associated with a STBC (STBC) from a plurality of STBCs associated with a wireless node, where the set of parameters includes at least a size of the STBC. The communications manager 420 is capable of, configured to, or operable to support a means for transmitting a second message on which the wireless node determines whether to encode one or more information bits according to the set of parameters associated with the STBC.

Additionally, or alternatively, the communications manager 420 may support wireless communications at a wireless node in accordance with examples as disclosed herein. For example, the communications manager 420 is capable of, configured to, or operable to support a means for receiving, from a network entity, a first message indicating a set of parameters associated with a STBC (STBC) from a plurality of STBCs associated with the wireless node, where the set of parameters includes at least a size of the STBC. The communications manager 420 is capable of, configured to, or operable to support a means for receiving, from the network entity, a second message on which the wireless node encodes one or more information bits according to the set of parameters associated with the STBC. The communications manager 420 is capable of, configured to, or operable to support a means for reflecting the second message to a UE based at least in part on the set of parameters, where the reflected second message includes the one or more encoded information bits.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for [[*Add modem/processor level advantages (e.g., reduced processing, reduced power consumption, more efficient utilization of communication resources)*]]

Figure 5:
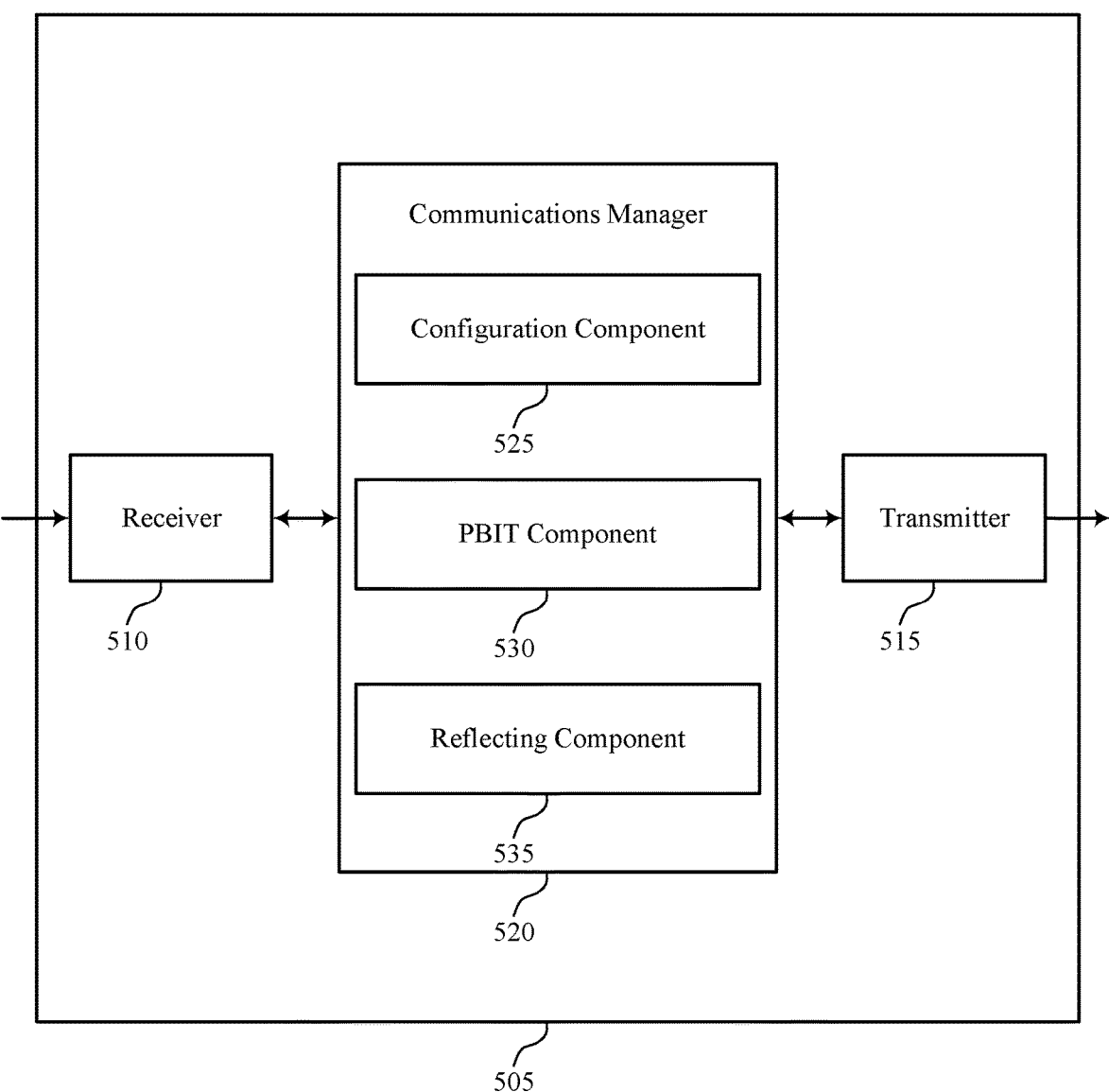

FIG. 5 shows a block diagram 500 of a device 505 that supports information transfer via channel-adaptive STBCs over RISs in accordance with one or more aspects of the present disclosure. The device 505 may be an example of aspects of a device 405 or a network entity 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The device 505, or various components thereof, may be an example of means for performing various aspects of information transfer via channel-adaptive STBCs over RISs as described herein. For example, the communications manager 520 may include a configuration component 525, a PBIT component 530, a reflecting component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a network entity in accordance with examples as disclosed herein. The configuration component 525 is capable of, configured to, or operable to support a means for transmitting a first message indicating a set of parameters associated with a STBC (STBC) from a plurality of STBCs associated with a wireless node, where the set of parameters includes at least a size of the STBC. The PBIT component 530 is capable of, configured to, or operable to support a means for transmitting a second message on which the wireless node determines whether to encode one or more information bits according to the set of parameters associated with the STBC.

Additionally, or alternatively, the communications manager 520 may support wireless communications at a wireless node in accordance with examples as disclosed herein. The configuration component 525 is capable of, configured to, or operable to support a means for receiving, from a network entity, a first message indicating a set of parameters associated with a STBC (STBC) from a plurality of STBCs associated with the wireless node, where the set of parameters includes at least a size of the STBC. The PBIT component 530 is capable of, configured to, or operable to support a means for receiving, from the network entity, a second message on which the wireless node encodes one or more information bits according to the set of parameters associated with the STBC. The reflecting component 535 is capable of, configured to, or operable to support a means for reflecting the second message to a UE based at least in part on the set of parameters, where the reflected second message includes the one or more encoded information bits.

Figure 6:
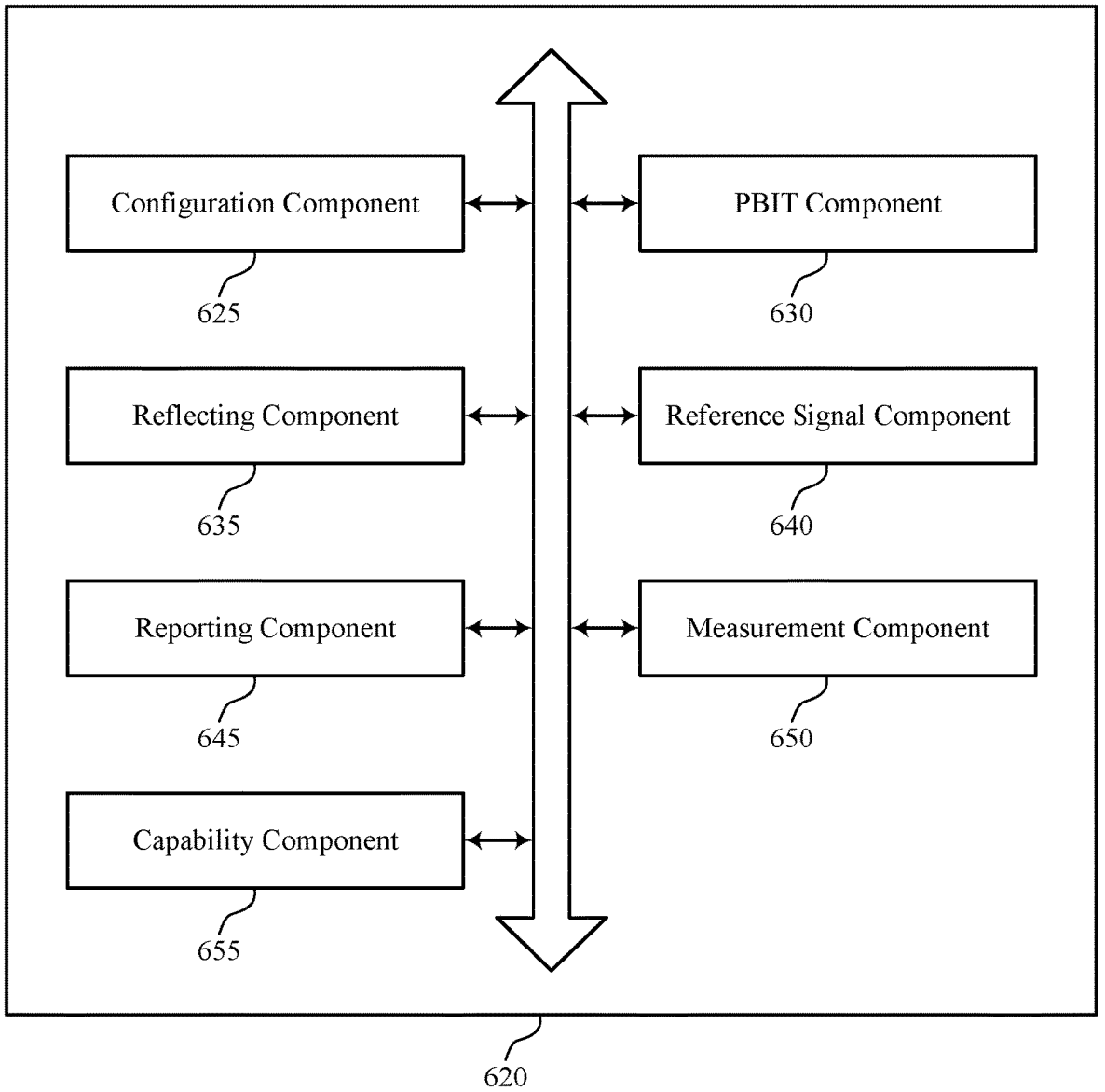
FIG. 6 shows a block diagram of a communications manager that supports information transfer via channel-adaptive STBCs over RISs in accordance with one or more aspects of the present disclosure.

FIG. 6 shows a block diagram 600 of a communications manager 620 that supports information transfer via channel-adaptive STBCs over RISs in accordance with one or more aspects of the present disclosure. The communications manager 620 may be an example of aspects of a communications manager 420, a communications manager 520, or both, as described herein. The communications manager 620, or various components thereof, may be an example of means for performing various aspects of information transfer via channel-adaptive STBCs over RISs as described herein. For example, the communications manager 620 may include a configuration component 625, a PBIT component 630, a reflecting component 635, a reference signal component 640, a reporting component 645, a measurement component 650, a capability component 655, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 620 may support wireless communications at a network entity in accordance with examples as disclosed herein. The configuration component 625 is capable of, configured to, or operable to support a means for transmitting a first message indicating a set of parameters associated with a STBC (STBC) from a plurality of STBCs associated with a wireless node, where the set of parameters includes at least a size of the STBC. The PBIT component 630 is capable of, configured to, or operable to support a means for transmitting a second message on which the wireless node determines whether to encode one or more information bits according to the set of parameters associated with the STBC.

In some examples, the STBC is associated with a plurality of channels, and the reference signal component 640 is capable of, configured to, or operable to support a means for transmitting, to the wireless node, a plurality of reference signals, where the set of multiple reference signals are transmitted via the set of multiple channels associated with the STBC.

In some examples, the reporting component 645 is capable of, configured to, or operable to support a means for receiving, from the wireless node, a measurement report indicating a correlation metric associated with the set of multiple channels.

In some examples, the configuration component 625 is capable of, configured to, or operable to support a means for transmitting a control message indicating a modification to the size of the STBC based at least in part on the correlation metric.

In some examples, the modification increases the size of the STBC based at least in part on the correlation metric exceeding a threshold.

In some examples, the modification decreases the size of the STBC based at least in part on the correlation metric failing to exceed a threshold.

In some examples, the reporting component 645 is capable of, configured to, or operable to support a means for transmitting a control message indicating for the wireless node to transmit the measurement report, where transmitting the measurement report is based at least in part on receiving the control message.

In some examples, the set of parameters include a type of the STBC, a start time associated with the wireless node reflecting the second message including the one or more encoded information bits, a stop time associated with the wireless node reflecting the second message including the one or more encoded information bits, or any combination thereof.

In some examples, the type of STBC includes a multi-symbol STBC type. In some examples, the set of parameters further includes a pattern associated with transmitting the one or more information bits in a time domain.

In some examples, the first message is a downlink control information message or a radio resource control message.

In some examples, the reference signal component 640 is capable of, configured to, or operable to support a means for transmitting, to a UE, one or more reference signals within a threshold duration of transmitting the second message, where a channel used to transmit the one or more reference signals is the same as a channel used to transmit the second message.

In some examples, the reporting component 645 is capable of, configured to, or operable to support a means for receiving, from the wireless node, a third message indicating a capability of the wireless node to support encoding information bits via a space time code block, where the set of parameters it based at least in part on the capability of the wireless node.

In some examples, the third message indicates a threshold quantity of sub-regions associated with the wireless node. In some examples, the size of the STBC is based at least in part on the threshold quantity.

In some examples, the size of the STBC is based at least in part on a quantity of sub-regions associated with the wireless node. In some examples, each sub-region is associated with a channel of a plurality of channels associated with the wireless node.

Additionally, or alternatively, the communications manager 620 may support wireless communications at a wireless node in accordance with examples as disclosed herein. In some examples, the configuration component 625 is capable of, configured to, or operable to support a means for receiving, from a network entity, a first message indicating a set of parameters associated with a STBC (STBC) from a plurality of STBCs associated with the wireless node, where the set of parameters includes at least a size of the STBC. In some examples, the PBIT component 630 is capable of, configured to, or operable to support a means for receiving, from the network entity, a second message on which the wireless node encodes one or more information bits according to the set of parameters associated with the STBC. The reflecting component 635 is capable of, configured to, or operable to support a means for reflecting the second message to a UE based at least in part on the set of parameters, where the reflected second message includes the one or more encoded information bits.

In some examples, the STBC is associated with a plurality of channels, and the measurement component 650 is capable of, configured to, or operable to support a means for receiving a plurality of reference signals, where the set of multiple reference signals are transmitted via the set of multiple channels associated with the STBC.

In some examples, the measurement component 650 is capable of, configured to, or operable to support a means for transmitting a measurement report indicating a correlation metric associated with the set of multiple channels.

In some examples, the configuration component 625 is capable of, configured to, or operable to support a means for receiving a control message indicating a modification to the size of the STBC based at least in part on the correlation metric.

In some examples, the modification increases the size of the STBC based at least in part on the correlation metric exceeding a threshold.

In some examples, the modification decreases the size of the STBC based at least in part on the correlation metric failing to exceed a threshold.

In some examples, the measurement component 650 is capable of, configured to, or operable to support a means for receiving a control message indicating for the wireless node to transmit the measurement report, where transmitting the measurement report is based at least in part on receiving the control message.

In some examples, the set of parameters include a type of the STBC, a start time associated with the wireless node reflecting the second message including the one or more encoded information bits, a stop time associated with the wireless node reflecting the second message including the one or more encoded information bits, or any combination thereof.

In some examples, the type of STBC includes a multi-symbol STBC type. In some examples, the set of parameters further includes a pattern associated with transmitting the one or more information bits in a time domain.

In some examples, the first message is a downlink control information message or a radio resource control message.

In some examples, the capability component 655 is capable of, configured to, or operable to support a means for transmitting a third message indicating a capability of the wireless node to support encoding information bits via a space time code block, where the set of parameters it based at least in part on the capability of the wireless node.

In some examples, the third message indicates a threshold quantity of sub-regions associated with the wireless node. In some examples, the size of the STBC is based at least in part on the threshold quantity.

In some examples, the size of the STBC is based at least in part on a quantity of sub-regions associated with the wireless node. In some examples, each sub-region is associated with a channel of a plurality of channels associated with the wireless node.

Figure 7:
FIG. 7 shows a diagram of a system including a device that supports information transfer via channel-adaptive STBCs over RISs in accordance with one or more aspects of the present disclosure.

FIG. 7 shows a diagram of a system 700 including a device 705 that supports information transfer via channel-adaptive STBCs over RISs in accordance with one or more aspects of the present disclosure. The device 705 may be an example of or include the components of a device 405, a device 505, or a network entity 105 as described herein. The device 705 may communicate with one or more network entities 105, one or more UEs 115, or any combination thereof, which may include communications over one or more wired interfaces, over one or more wireless interfaces, or any combination thereof. The device 705 may include components that support outputting and obtaining communications, such as a communications manager 720, a transceiver 710, an antenna 715, a memory 725, code 730, and a processor 735. These components may be in electronic communication or otherwise coupled (e.g., operatively, communicatively, functionally, electronically, electrically) via one or more buses (e.g., a bus 740).

The transceiver 710 may support bi-directional communications via wired links, wireless links, or both as described herein. In some examples, the transceiver 710 may include a wired transceiver and may communicate bi-directionally with another wired transceiver. Additionally, or alternatively, in some examples, the transceiver 710 may include a wireless transceiver and may communicate bi-directionally with another wireless transceiver. In some examples, the device 705 may include one or more antennas 715, which may be capable of transmitting or receiving wireless transmissions (e.g., concurrently). The transceiver 710 may also include a modem to modulate signals, to provide the modulated signals for transmission (e.g., by one or more antennas 715, by a wired transmitter), to receive modulated signals (e.g., from one or more antennas 715, from a wired receiver), and to demodulate signals. In some implementations, the transceiver 710 may include one or more interfaces, such as one or more interfaces coupled with the one or more antennas 715 that are configured to support various receiving or obtaining operations, or one or more interfaces coupled with the one or more antennas 715 that are configured to support various transmitting or outputting operations, or a combination thereof. In some implementations, the transceiver 710 may include or be configured for coupling with one or more processors or memory components that are operable to perform or support operations based at least in part on received or obtained information or signals, or to generate information or other signals for transmission or other outputting, or any combination thereof. In some implementations, the transceiver 710, or the transceiver 710 and the one or more antennas 715, or the transceiver 710 and the one or more antennas 715 and one or more processors or memory components (for example, the processor 735, or the memory 725, or both), may be included in a chip or chip assembly that is installed in the device 705. In some examples, the transceiver may be operable to support communications via one or more communications links (e.g., a communication link 125, a backhaul communication link 120, a midhaul communication link 162, a fronthaul communication link 168).

The memory 725 may include RAM and ROM. The memory 725 may store computer-readable, computer-executable code 730 including instructions that, when executed by the processor 735, cause the device 705 to perform various functions described herein. The code 730 may be stored in a non-transitory computer-readable medium such as system memory or another type of memory. In some cases, the code 730 may not be directly executable by the processor 735 but may cause a computer (e.g., when compiled and executed) to perform functions described herein. In some cases, the memory 725 may contain, among other things, a BIOS which may control basic hardware or software operation such as the interaction with peripheral components or devices.

The processor 735 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 735 may be configured to operate a memory array using a memory controller. In some other cases, a memory controller may be integrated into the processor 735. The processor 735 may be configured to execute computer-readable instructions stored in a memory (e.g., the memory 725) to cause the device 705 to perform various functions (e.g., functions or tasks supporting information transfer via channel-adaptive STBCs over RISs). For example, the device 705 or a component of the device 705 may include a processor 735 and memory 725 coupled with the processor 735, the processor 735 and memory 725 configured to perform various functions described herein. The processor 735 may be an example of a cloud-computing platform (e.g., one or more physical nodes and supporting software such as operating systems, virtual machines, or container instances) that may host the functions (e.g., by executing code 730) to perform the functions of the device 705. The processor 735 may be any one or more suitable processors capable of executing scripts or instructions of one or more software programs stored in the device 705 (such as within the memory 725). In some implementations, the processor 735 may be a component of a processing system. A processing system may generally refer to a system or series of machines or components that receives inputs and processes the inputs to produce a set of outputs (which may be passed to other systems or components of, for example, the device 705). For example, a processing system of the device 705 may refer to a system including the various other components or sub-components of the device 705, such as the processor 735, or the transceiver 710, or the communications manager 720, or other components or combinations of components of the device 705. The processing system of the device 705 may interface with other components of the device 705, and may process information received from other components (such as inputs or signals) or output information to other components. For example, a chip or modem of the device 705 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 705 may transmit information output from the chip or modem. Additionally, or alternatively, in some implementations, the one or more interfaces may refer to an interface between the processing system of the chip or modem and a receiver, such that the device 705 may obtain information or signal inputs, and the information may be passed to the processing system. A person having ordinary skill in the art will readily recognize that a first interface also may obtain information or signal inputs, and a second interface also may output information or signal outputs.

In some examples, a bus 740 may support communications of (e.g., within) a protocol layer of a protocol stack. In some examples, a bus 740 may support communications associated with a logical channel of a protocol stack (e.g., between protocol layers of a protocol stack), which may include communications performed within a component of the device 705, or between different components of the device 705 that may be co-located or located in different locations (e.g., where the device 705 may refer to a system in which one or more of the communications manager 720, the transceiver 710, the memory 725, the code 730, and the processor 735 may be located in one of the different components or divided between different components).

In some examples, the communications manager 720 may manage aspects of communications with a core network 130 (e.g., via one or more wired or wireless backhaul links). For example, the communications manager 720 may manage the transfer of data communications for client devices, such as one or more UEs 115. In some examples, the communications manager 720 may manage communications with other network entities 105, and may include a controller or scheduler for controlling communications with UEs 115 in cooperation with other network entities 105. In some examples, the communications manager 720 may support an X2 interface within an LTE/LTE-A wireless communications network technology to provide communication between network entities 105.

The communications manager 720 may support wireless communications at a network entity in accordance with examples as disclosed herein. For example, the communications manager 720 is capable of, configured to, or operable to support a means for transmitting a first message indicating a set of parameters associated with a STBC (STBC) from a plurality of STBCs associated with a wireless node, where the set of parameters includes at least a size of the STBC. The communications manager 720 is capable of, configured to, or operable to support a means for transmitting a second message on which the wireless node determines whether to encode one or more information bits according to the set of parameters associated with the STBC.

Additionally, or alternatively, the communications manager 720 may support wireless communications at a wireless node in accordance with examples as disclosed herein. For example, the communications manager 720 is capable of, configured to, or operable to support a means for receiving, from a network entity, a first message indicating a set of parameters associated with a STBC (STBC) from a plurality of STBCs associated with the wireless node, where the set of parameters includes at least a size of the STBC. The communications manager 720 is capable of, configured to, or operable to support a means for receiving, from the network entity, a second message on which the wireless node encodes one or more information bits according to the set of parameters associated with the STBC. The communications manager 720 is capable of, configured to, or operable to support a means for reflecting the second message to a UE based at least in part on the set of parameters, where the reflected second message includes the one or more encoded information bits.

By including or configuring the communications manager 720 in accordance with examples as described herein, the device 705 may support techniques for [[*Add device-level advantages (e.g., improved communication reliability, reduced latency, improved user experience related to reduced processing, reduced power consumption, more efficient utilization of communication resources, improved coordination between devices, longer battery life, improved utilization of processing capability)*]]

In some examples, the communications manager 720 may be configured to perform various operations (e.g., receiving, obtaining, monitoring, outputting, transmitting) using or otherwise in cooperation with the transceiver 710, the one or more antennas 715 (e.g., where applicable), or any combination thereof. Although the communications manager 720 is illustrated as a separate component, in some examples, one or more functions described with reference to the communications manager 720 may be supported by or performed by the transceiver 710, the processor 735, the memory 725, the code 730, or any combination thereof. For example, the code 730 may include instructions executable by the processor 735 to cause the device 705 to perform various aspects of information transfer via channel-adaptive STBCs over RISs as described herein, or the processor 735 and the memory 725 may be otherwise configured to perform or support such operations.

Figure 8:
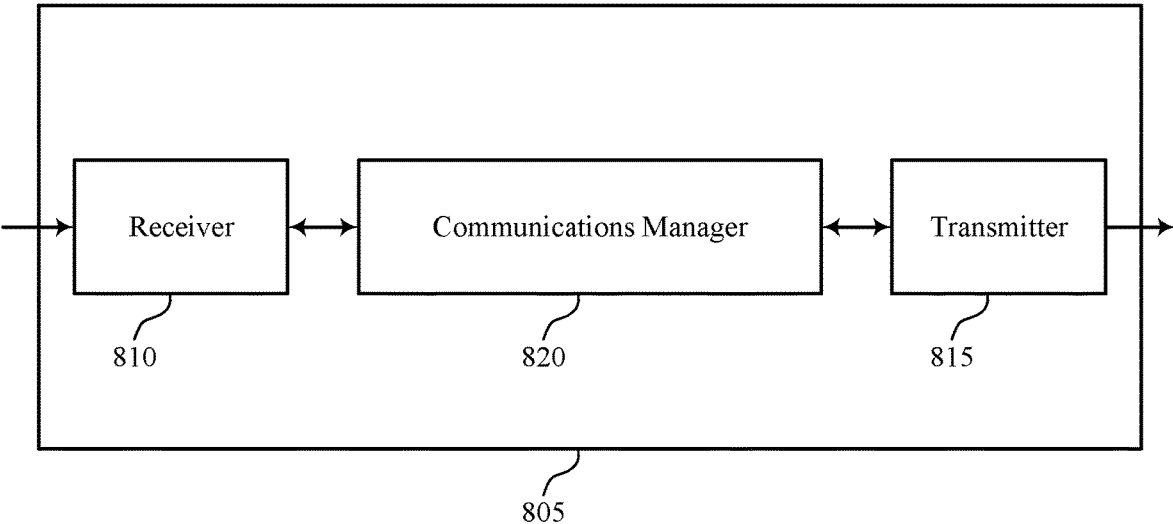
FIGS. 8 and 9 show block diagrams of devices that support information transfer via channel-adaptive STBCs over RISs in accordance with one or more aspects of the present disclosure.
Figure 8:

FIG. 8 shows a block diagram 800 of a device 805 that supports information transfer via channel-adaptive STBCs over RISs in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to information transfer via channel-adaptive STBCs over RISs). Information may be passed on to other components of the device 805. The receiver 810 may utilize a single antenna or a plurality of antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to information transfer via channel-adaptive STBCs over RISs). In some examples, the transmitter 815 may be co-located with a receiver 810 in a transceiver module. The transmitter 815 may utilize a single antenna or a plurality of antennas.

The communications manager 820, the receiver 810, the transmitter 815, or various combinations thereof or various components thereof may be examples of means for performing various aspects of information transfer via channel-adaptive STBCs over RISs as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, at least one processor and at least one memory coupled with the at least one processor may be configured to perform one or more of the functions described herein (e.g., by executing, by the at least one processor, instructions stored in the at least one memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. For example, the communications manager 820 is capable of, configured to, or operable to support a means for receiving, from a network entity, a first message indicating a set of parameters associated with a STBC (STBC) from a plurality of STBCs associated with a wireless node, where the set of parameters includes at least a size of the STBC. The communications manager 820 is capable of, configured to, or operable to support a means for receiving, from the wireless node, a second message including one or more information bits associated with the wireless node, where the UE identifies the one or more information bits based at least in part on a detection procedure associated with the set of parameters.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for [[*Add modem/processor level advantages (e.g., reduced processing, reduced power consumption, more efficient utilization of communication resources)*]]

Figure 9:
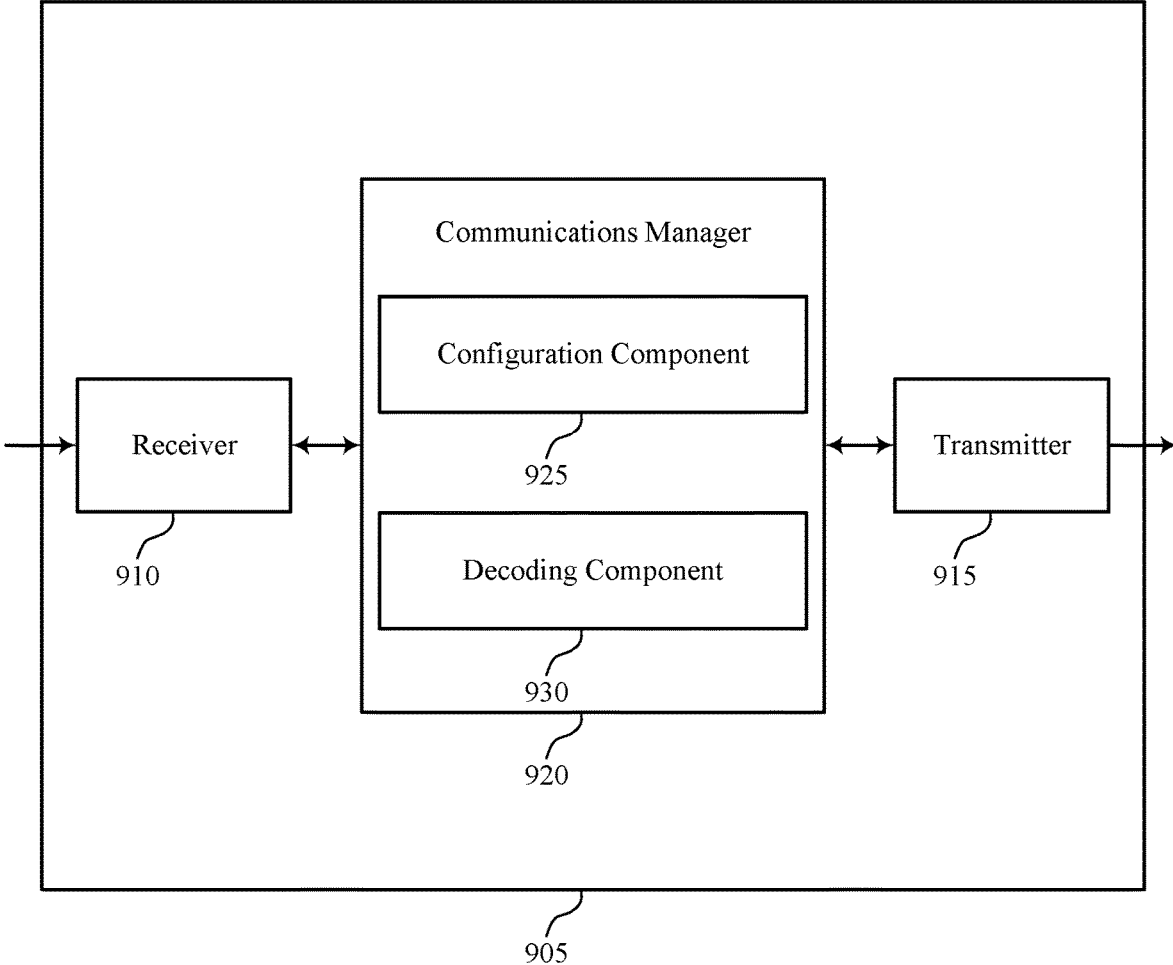

FIG. 9 shows a block diagram 900 of a device 905 that supports information transfer via channel-adaptive STBCs over RISs in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to information transfer via channel-adaptive STBCs over RISs). Information may be passed on to other components of the device 905. The receiver 910 may utilize a single antenna or a plurality of antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to information transfer via channel-adaptive STBCs over RISs). In some examples, the transmitter 915 may be co-located with a receiver 910 in a transceiver module. The transmitter 915 may utilize a single antenna or a plurality of antennas.

The device 905, or various components thereof, may be an example of means for performing various aspects of information transfer via channel-adaptive STBCs over RISs as described herein. For example, the communications manager 920 may include a configuration component 925 a decoding component 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a UE in accordance with examples as disclosed herein. The configuration component 925 is capable of, configured to, or operable to support a means for receiving, from a network entity, a first message indicating a set of parameters associated with a STBC (STBC) from a plurality of STBCs associated with a wireless node, where the set of parameters includes at least a size of the STBC. The decoding component 930 is capable of, configured to, or operable to support a means for receiving, from the wireless node, a second message including one or more information bits associated with the wireless node, where the UE identifies the one or more information bits based at least in part on a detection procedure associated with the set of parameters.

Figure 10:
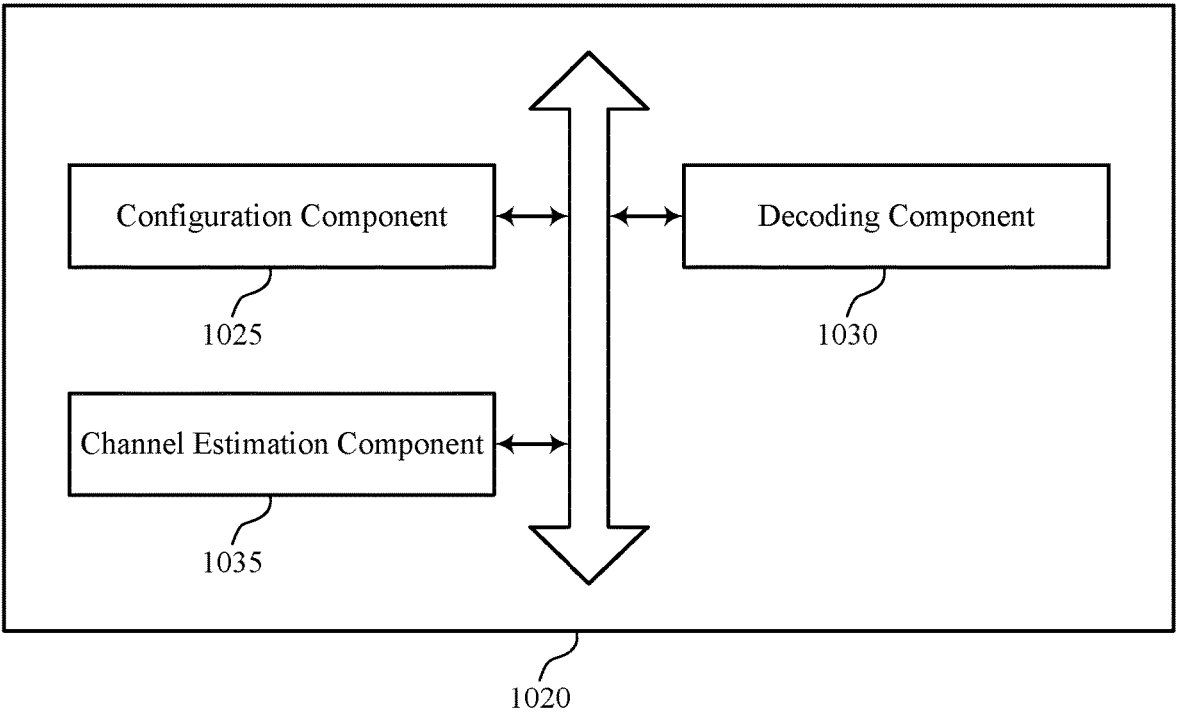
FIG. 10 shows a block diagram of a communications manager that supports information transfer via channel-adaptive STBCs over RISs in accordance with one or more aspects of the present disclosure.

FIG. 10 shows a block diagram 1000 of a communications manager 1020 that supports information transfer via channel-adaptive STBCs over RISs in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of information transfer via channel-adaptive STBCs over RISs as described herein. For example, the communications manager 1020 may include a configuration component 1025, a decoding component 1030, a channel estimation component 1035, or any combination thereof. Each of these components may communicate, directly or indirectly, with one another (e.g., via one or more buses).

The communications manager 1020 may support wireless communications at a UE in accordance with examples as disclosed herein. The configuration component 1025 is capable of, configured to, or operable to support a means for receiving, from a network entity, a first message indicating a set of parameters associated with a STBC (STBC) from a plurality of STBCs associated with a wireless node, where the set of parameters includes at least a size of the STBC. The decoding component 1030 is capable of, configured to, or operable to support a means for receiving, from the wireless node, a second message including one or more information bits associated with the wireless node, where the UE identifies the one or more information bits based at least in part on a detection procedure associated with the set of parameters.

In some examples, the set of parameters include a type of the STBC, a start time associated with receiving the second message including the one or more information bits, a stop time associated with receiving the second message including the one or more information bits, or any combination thereof.

In some examples, the type of STBC includes a multi-symbol STBC type. In some examples, the set of parameters further includes a pattern associated with transmitting the one or more information bits in a time domain.

In some examples, the first message is a downlink control information message or a radio resource control message.

In some examples, the channel estimation component 1035 is capable of, configured to, or operable to support a means for receiving one or more reference signals within a threshold duration of receiving the second message, where a channel used to transmit the one or more reference signals is the same as a channel used to transmit the second message.

In some examples, the channel estimation component 1035 is capable of, configured to, or operable to support a means for estimating the channel based at least in part on receiving the one or more reference signals, where the detection procedure is based at least in part on the channel estimation.

In some examples, the size of the STBC is based at least in part on a quantity of sub-regions associated with the wireless node. In some examples, each sub-region is associated with a channel of a plurality of channels associated with the wireless node.

In some examples, the detection procedure includes a maximum likelihood detector, a low-complexity detector, or any combination thereof.

Figure 11:
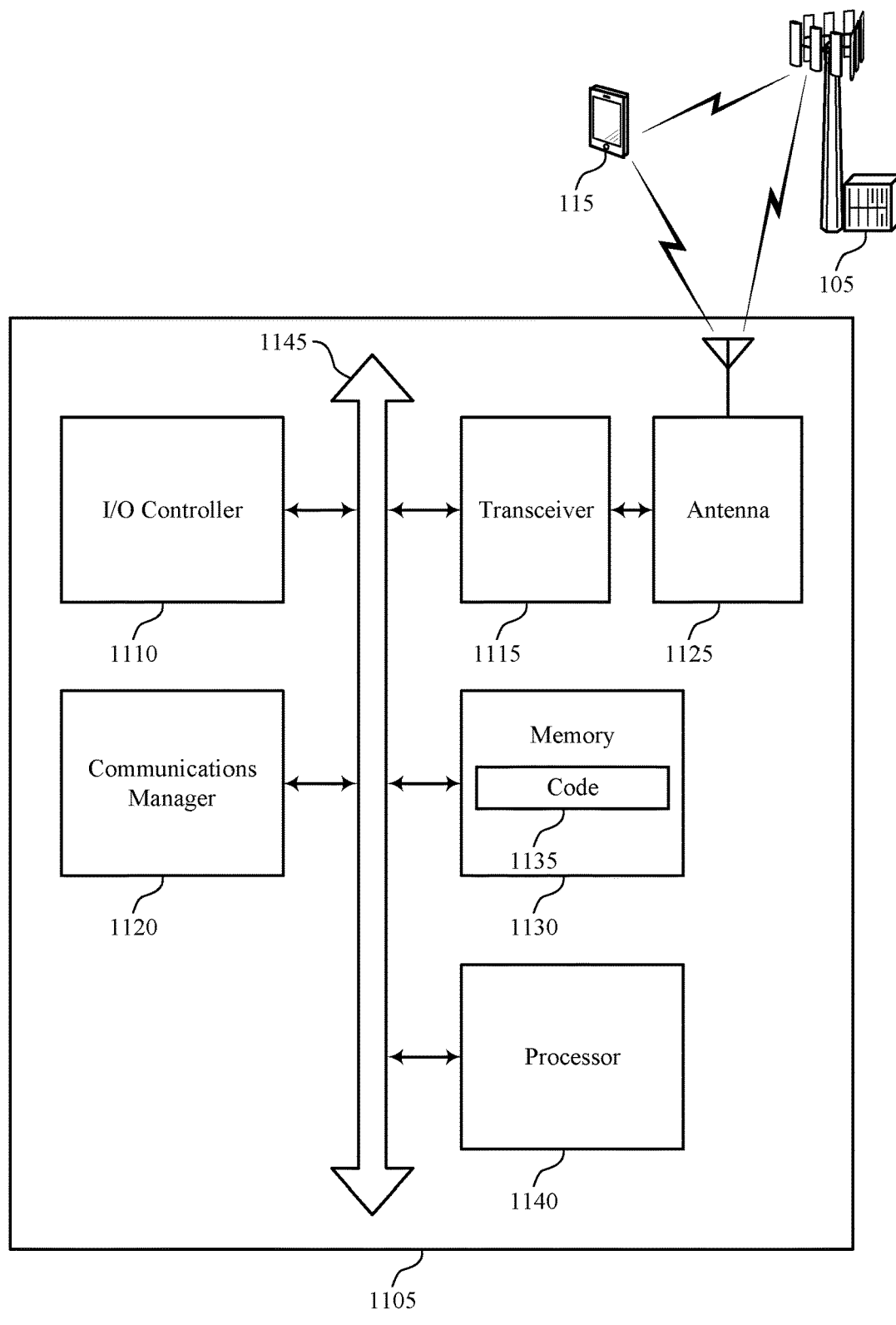
FIG. 11 shows a diagram of a system including a device that supports information transfer via channel-adaptive STBCs over RISs in accordance with one or more aspects of the present disclosure.

FIG. 11 shows a diagram of a system 1100 including a device 1105 that supports information transfer via channel-adaptive STBCs over RISs in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting information transfer via channel-adaptive STBCs over RISs). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communications at a UE in accordance with examples as disclosed herein. For example, the communications manager 1120 is capable of, configured to, or operable to support a means for receiving, from a network entity, a first message indicating a set of parameters associated with a STBC (STBC) from a plurality of STBCs associated with a wireless node, where the set of parameters includes at least a size of the STBC. The communications manager 1120 is capable of, configured to, or operable to support a means for receiving, from the wireless node, a second message including one or more information bits associated with the wireless node, where the UE identifies the one or more information bits based at least in part on a detection procedure associated with the set of parameters.

By including or configuring the communications manager 1120 in accordance with examples as described herein, the device 1105 may support techniques for [[*Add device-level advantages (e.g., improved communication reliability, reduced latency, improved user experience related to reduced processing, reduced power consumption, more efficient utilization of communication resources, improved coordination between devices, longer battery life, improved utilization of processing capability)*]]

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of information transfer via channel-adaptive STBCs over RISs as described herein, or the processor 1140 and the memory 1130 may be otherwise configured to perform or support such operations.

FIG. 12 shows a flowchart illustrating a method 1200 that supports information transfer via channel-adaptive STBCs over RISs in accordance with aspects of the present disclosure. The operations of the method 1200 may be implemented by a network entity or its components as described herein. For example, the operations of the method 1200 may be performed by a network entity as described with reference to FIGS. 1 through 7. In some examples, a network entity may execute a set of instructions to control the functional elements of the wireless network entity to perform the described functions. Additionally, or alternatively, the wireless network entity may perform aspects of the described functions using special-purpose hardware.

At 1205, the method may include transmitting a first message indicating a set of parameters associated with a STBC (STBC) from a plurality of STBCs associated with a wireless node, where the set of parameters includes at least a size of the STBC. The operations of 1205 may be performed in accordance with examples as disclosed herein. In some examples, aspects of the operations of 1205 may be performed by a configuration component 625 as described with reference to FIG. 6.

At 1210, the method may include transmitting a second message on which the wireless node determines whether to encode one or more information bits according to the set of parameters associated with the STBC. The operations of 1210 may be performed in accordance with examples as disclosed herein. In some examples, aspects of the operations of 1210 may be performed by a PBIT component 630 as described with reference to FIG. 6.

FIG. 13 shows a flowchart illustrating a method 1300 that supports information transfer via channel-adaptive STBCs over RISs in accordance with aspects of the present disclosure. The operations of the method 1300 may be implemented by a network entity or its components as described herein. For example, the operations of the method 1300 may be performed by a network entity as described with reference to FIGS. 1 through 7. In some examples, a network entity may execute a set of instructions to control the functional elements of the wireless network entity to perform the described functions. Additionally, or alternatively, the wireless network entity may perform aspects of the described functions using special-purpose hardware.

At 1305, the method may include receiving, from a network entity, a first message indicating a set of parameters associated with a STBC (STBC) from a plurality of STBCs associated with the wireless node, where the set of parameters includes at least a size of the STBC. The operations of 1305 may be performed in accordance with examples as disclosed herein. In some examples, aspects of the operations of 1305 may be performed by a configuration component 625 as described with reference to FIG. 6.

At 1310, the method may include receiving, from the network entity, a second message on which the wireless node encodes one or more information bits according to the set of parameters associated with the STBC. The operations of 1310 may be performed in accordance with examples as disclosed herein. In some examples, aspects of the operations of 1310 may be performed by a PBIT component 630 as described with reference to FIG. 6.

At 1315, the method may include reflecting the second message to a UE based at least in part on the set of parameters, where the reflected second message includes the one or more encoded information bits. The operations of 1315 may be performed in accordance with examples as disclosed herein. In some examples, aspects of the operations of 1315 may be performed by a reflecting component 635 as described with reference to FIG. 6.

FIG. 14 shows a flowchart illustrating a method 1400 that supports information transfer via channel-adaptive STBCs over RISs in accordance with aspects of the present disclosure. The operations of the method 1400 may be implemented by a UE or its components as described herein. For example, the operations of the method 1400 may be performed by a UE 115 as described with reference to FIGS. 1 through 3 and 8 through 11. In some examples, a UE may execute a set of instructions to control the functional elements of the wireless UE to perform the described functions. Additionally, or alternatively, the wireless UE may perform aspects of the described functions using special-purpose hardware.

At 1405, the method may include receiving, from a network entity, a first message indicating a set of parameters associated with a STBC (STBC) from a plurality of STBCs associated with a wireless node, where the set of parameters includes at least a size of the STBC. The operations of 1405 may be performed in accordance with examples as disclosed herein. In some examples, aspects of the operations of 1405 may be performed by a configuration component 1025 as described with reference to FIG. 10.

At 1410, the method may include receiving, from the wireless node, a second message including one or more information bits associated with the wireless node, where the UE identifies the one or more information bits based at least in part on a detection procedure associated with the set of parameters. The operations of 1410 may be performed in accordance with examples as disclosed herein. In some examples, aspects of the operations of 1410 may be performed by a decoding component 1030 as described with reference to FIG. 10.

The following provides an overview of aspects of the present disclosure:

Aspect 1: A method for wireless communications at a network entity, comprising: transmitting a first message indicating a set of parameters associated with a STBC from a plurality of STBCs associated with a wireless node, where the set of parameters comprises at least a size of the STBC; and transmitting a second message on which the wireless node determines whether to encode one or more information bits according to the set of parameters associated with the STBC.s Aspect 2: The method of aspect 1, wherein the STBC is associated with a plurality of channels, the method further comprising: transmitting, to the wireless node, a plurality of reference signals, wherein the plurality of reference signals are transmitted via the plurality of channels associated with the STBC.

Aspect 3: The method of aspect 2, further comprising: receiving, from the wireless node, a measurement report indicating a correlation metric associated with the plurality of channels.

Aspect 4: The method of aspect 3, further comprising: transmitting a control message indicating a modification to the size of the STBC based at least in part on the correlation metric.

Aspect 5: The method of aspect 4, wherein the modification increases the size of the STBC based at least in part on the correlation metric exceeding a threshold.

Aspect 6: The method of any of aspects 4 through 5, wherein the modification decreases the size of the STBC based at least in part on the correlation metric failing to exceed a threshold.

Aspect 7: The method of any of aspects 3 through 6, further comprising: transmitting a control message indicating for the wireless node to transmit the measurement report, wherein transmitting the measurement report is based at least in part on receiving the control message.

Aspect 8: The method of any of aspects 1 through 7, wherein the set of parameters comprise a type of the STBC, a start time associated with the wireless node reflecting the second message comprising the one or more encoded information bits, a stop time associated with the wireless node reflecting the second message comprising the one or more encoded information bits, or any combination thereof.

Aspect 9: The method of aspect 8, wherein the type of STBC comprises a multi-symbol STBC type, and the set of parameters further comprises a pattern associated with transmitting the one or more information bits in a time domain.

Aspect 10: The method of any of aspects 8 through 9, wherein the first message is a downlink control information message or a radio resource control message.

Aspect 11: The method of any of aspects 1 through 10, further comprising: transmitting, to a UE, one or more reference signals within a threshold duration of transmitting the second message, wherein a channel used to transmit the one or more reference signals is the same as a channel used to transmit the second message.

Aspect 12: The method of any of aspects 1 through 11, further comprising: receiving, from the wireless node, a third message indicating a capability of the wireless node to support encoding information bits via a space time code block, wherein the set of parameters it based at least in part on the capability of the wireless node.

Aspect 13: The method of aspect 12, wherein the third message indicates a threshold quantity of sub-regions associated with the wireless node, and the size of the STBC is based at least in part on the threshold quantity.

Aspect 14: The method of any of aspects 1 through 13, wherein the size of the STBC is based at least in part on a quantity of sub-regions associated with the wireless node, and each sub-region is associated with a channel of a plurality of channels associated with the wireless node.

Aspect 15: A method for wireless communications at a wireless node, comprising: receiving, from a network entity, a first message indicating a set of parameters associated with a STBC from a plurality of STBCs associated with the wireless node, where the set of parameters comprises at least a size of the STBC; receiving, from the network entity, a second message on which the wireless node encodes one or more information bits according to the set of parameters associated with the STBC; and reflecting the second message to a UE based at least in part on the set of parameters, wherein the reflected second message includes the one or more encoded information bits.

Aspect 16: The method of aspect 15, wherein the STBC is associated with a plurality of channels, the method further comprising: receiving a plurality of reference signals, wherein the plurality of reference signals are transmitted via the plurality of channels associated with the STBC.

Aspect 17: The method of aspect 16, further comprising: transmitting a measurement report indicating a correlation metric associated with the plurality of channels.

Aspect 18: The method of aspect 17, further comprising: receiving a control message indicating a modification to the size of the STBC based at least in part on the correlation metric.

Aspect 19: The method of aspect 18, wherein the modification increases the size of the STBC based at least in part on the correlation metric exceeding a threshold.

Aspect 20: The method of any of aspects 18 through 19, wherein the modification decreases the size of the STBC based at least in part on the correlation metric failing to exceed a threshold.

Aspect 21: The method of any of aspects 17 through 20, further comprising: receiving a control message indicating for the wireless node to transmit the measurement report, wherein transmitting the measurement report is based at least in part on receiving the control message.

Aspect 22: The method of any of aspects 15 through 21, wherein the set of parameters comprise a type of the STBC, a start time associated with the wireless node reflecting the second message comprising the one or more encoded information bits, a stop time associated with the wireless node reflecting the second message comprising the one or more encoded information bits, or any combination thereof.

Aspect 23: The method of aspect 22, wherein the type of STBC comprises a multi-symbol STBC type, and the set of parameters further comprises a pattern associated with transmitting the one or more information bits in a time domain.

Aspect 24: The method of any of aspects 22 through 23, wherein the first message is a downlink control information message or a radio resource control message.

Aspect 25: The method of any of aspects 15 through 24, further comprising: transmitting a third message indicating a capability of the wireless node to support encoding information bits via a space time code block, wherein the set of parameters it based at least in part on the capability of the wireless node.

Aspect 26: The method of aspect 25, wherein the third message indicates a threshold quantity of sub-regions associated with the wireless node, and the size of the STBC is based at least in part on the threshold quantity.

Aspect 27: The method of any of aspects 15 through 26, wherein the size of the STBC is based at least in part on a quantity of sub-regions associated with the wireless node, and each sub-region is associated with a channel of a plurality of channels associated with the wireless node.

Aspect 28: A method for wireless communications at a UE, comprising: receiving, from a network entity, a first message indicating a set of parameters associated with a STBC from a plurality of STBCs associated with a wireless node, where the set of parameters comprises at least a size of the STBC; and receiving, from the wireless node, a second message including one or more information bits associated with the wireless node, wherein the UE identifies the one or more information bits based at least in part on a detection procedure associated with the set of parameters.

Aspect 29: The method of aspect 28, wherein the set of parameters comprise a type of the STBC, a start time associated with receiving the second message comprising the one or more information bits, a stop time associated with receiving the second message comprising the one or more information bits, or any combination thereof.

Aspect 30: The method of aspect 29, wherein the type of STBC comprises a multi-symbol STBC type, and the set of parameters further comprises a pattern associated with transmitting the one or more information bits in a time domain.

Aspect 31: The method of any of aspects 29 through 30, wherein the first message is a downlink control information message or a radio resource control message.

Aspect 32: The method of any of aspects 28 through 31, further comprising: receiving one or more reference signals within a threshold duration of receiving the second message, wherein a channel used to transmit the one or more reference signals is the same as a channel used to transmit the second message.

Aspect 33: The method of aspect 32, further comprising: estimating the channel based at least in part on receiving the one or more reference signals, wherein the detection procedure is based at least in part on the channel estimation.

Aspect 34: The method of any of aspects 28 through 33, wherein the size of the STBC is based at least in part on a quantity of sub-regions associated with the wireless node, and each sub-region is associated with a channel of a plurality of channels associated with the wireless node.

Aspect 35: The method of any of aspects 28 through 34, wherein the detection procedure comprises a maximum likelihood detector, a low-complexity detector, or any combination thereof.

Aspect 36: An apparatus for wireless communications at a network entity, comprising at least one processor; at least one memory coupled with the at least one processor; and instructions stored in the at least one memory and executable by the at least one processor to cause the apparatus to perform a method of any of aspects 1 through 14.

Aspect 37: An apparatus for wireless communications at a network entity, comprising at least one means for performing a method of any of aspects 1 through 14.

Aspect 38: A non-transitory computer-readable medium storing code for wireless communications at a network entity, the code comprising instructions executable by a processor to perform a method of any of aspects 1 through 14.

Aspect 39: An apparatus for wireless communications at a wireless node, comprising at least one processor; at least one memory coupled with the at least one processor; and instructions stored in the at least one memory and executable by the at least one processor to cause the apparatus to perform a method of any of aspects 15 through 27.

Aspect 40: An apparatus for wireless communications at a wireless node, comprising at least one means for performing a method of any of aspects 15 through 27.

Aspect 41: A non-transitory computer-readable medium storing code for wireless communications at a wireless node, the code comprising instructions executable by a processor to perform a method of any of aspects 15 through 27.

Aspect 42: An apparatus for wireless communications at a UE, comprising at least one processor; at least one memory coupled with the at least one processor; and instructions stored in the at least one memory and executable by the at least one processor to cause the apparatus to perform a method of any of aspects 28 through 35.

Aspect 43: An apparatus for wireless communications at a UE, comprising at least one means for performing a method of any of aspects 28 through 35.

Aspect 44: A non-transitory computer-readable medium storing code for wireless communications at a UE, the code comprising instructions executable by a processor to perform a method of any of aspects 28 through 35.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the at least one processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Additionally, as used herein, an action performed by "at least one" component shall be construed as one or more components individually or collectively performing the action.

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a network entity, comprising:

at least one processor; and at least one memory coupled with the at least one processor, wherein the at least one memory comprises instructions executable by the at least one processor to cause the apparatus to:

transmit a first message indicating a set of parameters associated with a space time block code (STBC) from a plurality of STBCs associated with a wireless node, where the set of parameters comprises at least a size of the STBC; and transmit a second message on which the wireless node determines whether to encode one or more information bits according to the set of parameters associated with the STBC.

2. The apparatus of claim 1, wherein the STBC is associated with a plurality of channels, and the instructions are further executable by the at least one processor to cause the apparatus to:

transmit, to the wireless node, a plurality of reference signals, wherein the plurality of reference signals are transmitted via the plurality of channels associated with the STBC.

3. The apparatus of claim 2, wherein the instructions are further executable by the at least one processor to cause the apparatus to:

receive, from the wireless node, a measurement report indicating a correlation metric associated with the plurality of channels.

4. The apparatus of claim 3, wherein the instructions are further executable by the at least one processor to cause the apparatus to:

transmit a control message indicating a modification to the size of the STBC based at least in part on the correlation metric.

5. The apparatus of claim 3, wherein the instructions are further executable by the at least one processor to cause the apparatus to:

transmit a control message indicating for the wireless node to transmit the measurement report, wherein transmitting the measurement report is based at least in part on receiving the control message.

6. The apparatus of claim 4, wherein the modification increases the size of the STBC based at least in part on the correlation metric exceeding a threshold.

7. The apparatus of claim 4, wherein the modification decreases the size of the STBC based at least in part on the correlation metric failing to exceed a threshold.

8. The apparatus of claim 1, wherein the set of parameters comprise a type of the STBC, a start time associated with the wireless node reflecting the second message comprising the one or more encoded information bits, a stop time associated with the wireless node reflecting the second message comprising the one or more encoded information bits, or any combination thereof.

9. The apparatus of claim 8, wherein the type of STBC comprises a multi-symbol STBC type, and wherein the set of parameters further comprises a pattern associated with transmitting the one or more information bits in a time domain.

10. The apparatus of claim 8, wherein the first message is a downlink control information message or a radio resource control message.

11. The apparatus of claim 1, wherein the instructions are further executable by the at least one processor to cause the apparatus to:

transmit, to a user equipment (UE), one or more reference signals within a threshold duration of transmitting the second message, wherein a channel used to transmit the one or more reference signals is the same as a channel used to transmit the second message.

12. The apparatus of claim 1, wherein the instructions are further executable by the at least one processor to cause the apparatus to:

receive, from the wireless node, a third message indicating a capability of the wireless node to support encoding information bits via a space time code block, wherein the set of parameters it based at least in part on the capability of the wireless node.

13. The apparatus of claim 12, wherein the third message indicates a threshold quantity of sub-regions associated with the wireless node, and wherein the size of the STBC is based at least in part on the threshold quantity.

14. The apparatus of claim 1, wherein the size of the STBC is based at least in part on a quantity of sub-regions associated with the wireless node, and wherein each sub-region is associated with a channel of a plurality of channels associated with the wireless node.

15. An apparatus for wireless communications at a wireless node, comprising:

at least one processor; and at least one memory coupled with the at least one processor, wherein the at least one memory comprises instructions executable by the at least one processor to cause the apparatus to:

receive, from a network entity, a first message indicating a set of parameters associated with a space time block code (STBC) from a plurality of STBCs associated with the wireless node, where the set of parameters comprises at least a size of the STBC;

receive, from the network entity, a second message on which the wireless node encodes one or more information bits according to the set of parameters associated with the STBC; and reflect the second message to a user equipment (UE) based at least in part on the set of parameters, wherein the reflected second message includes the one or more encoded information bits.

16. The apparatus of claim 15, wherein the STBC is associated with a plurality of channels, and the instructions are further executable by the at least one processor to cause the apparatus to:

receive a plurality of reference signals, wherein the plurality of reference signals are transmitted via the plurality of channels associated with the STBC.

17. The apparatus of claim 16, wherein the instructions are further executable by the at least one processor to cause the apparatus to:

transmit a measurement report indicating a correlation metric associated with the plurality of channels.

18. The apparatus of claim 17, wherein the instructions are further executable by the at least one processor to cause the apparatus to:

receive a control message indicating a modification to the size of the STBC based at least in part on the correlation metric.

19. The apparatus of claim 17, wherein the instructions are further executable by the at least one processor to cause the apparatus to:

receive a control message indicating for the wireless node to transmit the measurement report, wherein transmitting the measurement report is based at least in part on receiving the control message.

20. The apparatus of claim 18, wherein the modification increases the size of the STBC based at least in part on the correlation metric exceeding a threshold.

21. The apparatus of claim 18, wherein the modification decreases the size of the STBC based at least in part on the correlation metric failing to exceed a threshold.

22. The apparatus of claim 15, wherein the set of parameters comprise a type of the STBC, a start time associated with the wireless node reflecting the second message comprising the one or more encoded information bits, a stop time associated with the wireless node reflecting the second message comprising the one or more encoded information bits, or any combination thereof.

23. The apparatus of claim 22, wherein the type of STBC comprises a multi-symbol STBC type, and wherein the set of parameters further comprises a pattern associated with transmitting the one or more information bits in a time domain.

24. The apparatus of claim 22, wherein the first message is a downlink control information message or a radio resource control message.

25. The apparatus of claim 15, wherein the instructions are further executable by the at least one processor to cause the apparatus to:

transmit a third message indicating a capability of the wireless node to support encoding information bits via a space time code block, wherein the set of parameters it based at least in part on the capability of the wireless node.

26. The apparatus of claim 25, wherein the third message indicates a threshold quantity of sub-regions associated with the wireless node, and wherein the size of the STBC is based at least in part on the threshold quantity.

27. A method for wireless communications at a network entity, comprising:

transmitting a first message indicating a set of parameters associated with a space time block code (STBC) from a plurality of STBCs associated with a wireless node, where the set of parameters comprises at least a size of the STBC; and transmitting a second message on which the wireless node determines whether to encode one or more information bits according to the set of parameters associated with the STBC.

28. The method of claim 27, wherein the STBC is associated with a plurality of channels, the method further comprising:

transmitting, to the wireless node, a plurality of reference signals, wherein the plurality of reference signals are transmitted via the plurality of channels associated with the STBC.

* * * * *